United States Patent
Lu

(10) Patent No.: US 9,894,216 B2
(45) Date of Patent: Feb. 13, 2018

(54) METHODS AND SYSTEMS FOR TELECOMMUNICATION MESSAGING AND REAL-TIME REPLENISHMENT SYSTEMS

(71) Applicant: MILTECH PLATFORM, INC., Duluth, GA (US)

(72) Inventor: Dat The Lu, Duluth, GA (US)

(73) Assignee: MILTECH PLATFORM, INC., Duluth, GA (US)

( * ) Notice: Subject to any disclaimer, the term of this patent is extended or adjusted under 35 U.S.C. 154(b) by 0 days.

(21) Appl. No.: 15/379,033

(22) Filed: Dec. 14, 2016

(65) Prior Publication Data

US 2017/0099395 A1   Apr. 6, 2017

Related U.S. Application Data

(63) Continuation-in-part of application No. 15/238,484, filed on Aug. 16, 2016, now abandoned, which is a
(Continued)

(51) Int. Cl.
*H04M 17/00* (2006.01)
*H04M 15/00* (2006.01)

(52) U.S. Cl.
CPC ....... *H04M 17/206* (2013.01); *H04M 15/705* (2013.01); *H04M 15/8033* (2013.01); *H04M 17/208* (2013.01); *H04M 2017/243* (2013.01)

(58) Field of Classification Search
CPC .......... H04M 17/206; H04M 15/8033; H04M 17/208; H04M 15/705; H04M 2017/243
See application file for complete search history.

(56) References Cited

U.S. PATENT DOCUMENTS

| 6,792,271 B1 | 9/2004 | Sherman et al. |
| 6,934,529 B2 | 8/2005 | Bagoren et al. |

(Continued)

FOREIGN PATENT DOCUMENTS

| KR | 2004-0068768 A | 8/2004 |
| KR | 2004-0100217 A | 12/2004 |

(Continued)

OTHER PUBLICATIONS

International Search Report and Written Opinion of the International Searching Authority dated Apr. 13, 2017, for corresponding PCT/US2016/066604; filed Dec. 14, 2016.
(Continued)

*Primary Examiner* — Kenneth Lam
(74) *Attorney, Agent, or Firm* — Next ip Law Group LLC; Minh N. Nguyen

(57) ABSTRACT

Methods and systems for top-up are provided. A representative telecommunication messaging and real-time replenishment (TMRTR) system includes a user interface that receives a user input and transmits the user input that includes chat message and a recipient phone number associated with a phone user's account; and a real-time replenishment (RTR) gateway that receives and transmits chat messages and the phone number from the user interface and requests for a telephone service company associated with the phone number to a home location register (HLR) look up service. The RTR gateway tops up phone minutes and/or balance of money of the phone user's account associated with the phone number based on the phone number of the received user input, and the determined telephone service company from the HLR look up service.

20 Claims, 33 Drawing Sheets

Related U.S. Application Data continuation of application No. 14/454,668, filed on Aug. 7, 2014, now Pat. No. 9,432,525.

(60) Provisional application No. 62/267,451, filed on Dec. 15, 2015, provisional application No. 61/863,407, filed on Aug. 7, 2013.

(56) References Cited

U.S. PATENT DOCUMENTS

| | | | |
|---|---|---|---|
| 8,000,455 B1 | 8/2011 | Van Haaften et al. | |
| 8,160,961 B1 | 4/2012 | Haatja et al. | |
| 8,219,089 B1 | 7/2012 | Kindred et al. | |
| 2003/0166396 A1 | 9/2003 | Vermelle et al. | |
| 2003/0217014 A1* | 11/2003 | Mollett | G06Q 20/401 |
| | | | 705/75 |
| 2004/0009760 A1 | 1/2004 | Laybourn et al. | |
| 2005/0250501 A1 | 11/2005 | Mobin et al. | |
| 2008/0139171 A1 | 6/2008 | Bernath | |
| 2008/0233982 A1 | 9/2008 | Smith et al. | |
| 2009/0005000 A1* | 1/2009 | Baker | G06Q 10/103 |
| | | | 455/405 |
| 2009/0163181 A1 | 6/2009 | Ung et al. | |
| 2009/0192928 A1* | 7/2009 | Abifaker | G06Q 30/02 |
| | | | 705/35 |
| 2009/0204510 A1* | 8/2009 | Hwang | G06Q 20/102 |
| | | | 705/26.1 |
| 2009/0234747 A1 | 8/2009 | Peon et al. | |
| 2010/0330956 A1 | 12/2010 | Estrada | |
| 2011/0029862 A1 | 2/2011 | Scott et al. | |
| 2011/0270747 A1 | 11/2011 | Xu | |
| 2012/0011228 A1 | 1/2012 | Corda et al. | |
| 2012/0123922 A1* | 5/2012 | Nicolaidis | G06Q 30/02 |
| | | | 705/35 |
| 2013/0304637 A1* | 11/2013 | McCabe | G06Q 20/12 |
| | | | 705/39 |
| 2014/0038545 A1 | 2/2014 | Ramprasad et al. | |
| 2014/0099915 A1* | 4/2014 | Dean | H04W 4/003 |
| | | | 455/406 |
| 2014/0108120 A1 | 4/2014 | Pirillo | |
| 2015/0044990 A1* | 2/2015 | Lu | H04M 17/206 |
| | | | 455/406 |
| 2015/0088753 A1* | 3/2015 | Van Der Schueren | G06Q 20/351 |
| | | | 705/67 |
| 2016/0232609 A1* | 8/2016 | Lindemulder | G06Q 40/04 |
| 2017/0046682 A1* | 2/2017 | Prakash | G06Q 20/16 |

FOREIGN PATENT DOCUMENTS

| | | |
|---|---|---|
| KR | 2008-0114651 A | 12/2008 |
| KR | 2010-0037297 A | 4/2010 |
| WO | 2003-102887 | 12/2003 |
| WO | 2010-131226 | 1/2011 |
| WO | 2011-161698 | 12/2011 |
| WO | 2012-114142 | 8/2012 |

OTHER PUBLICATIONS

International Preliminary Report on Patentability, Chapter I of the PCT, PCT/US2014/050240, dated Feb 18, 2016.

* cited by examiner

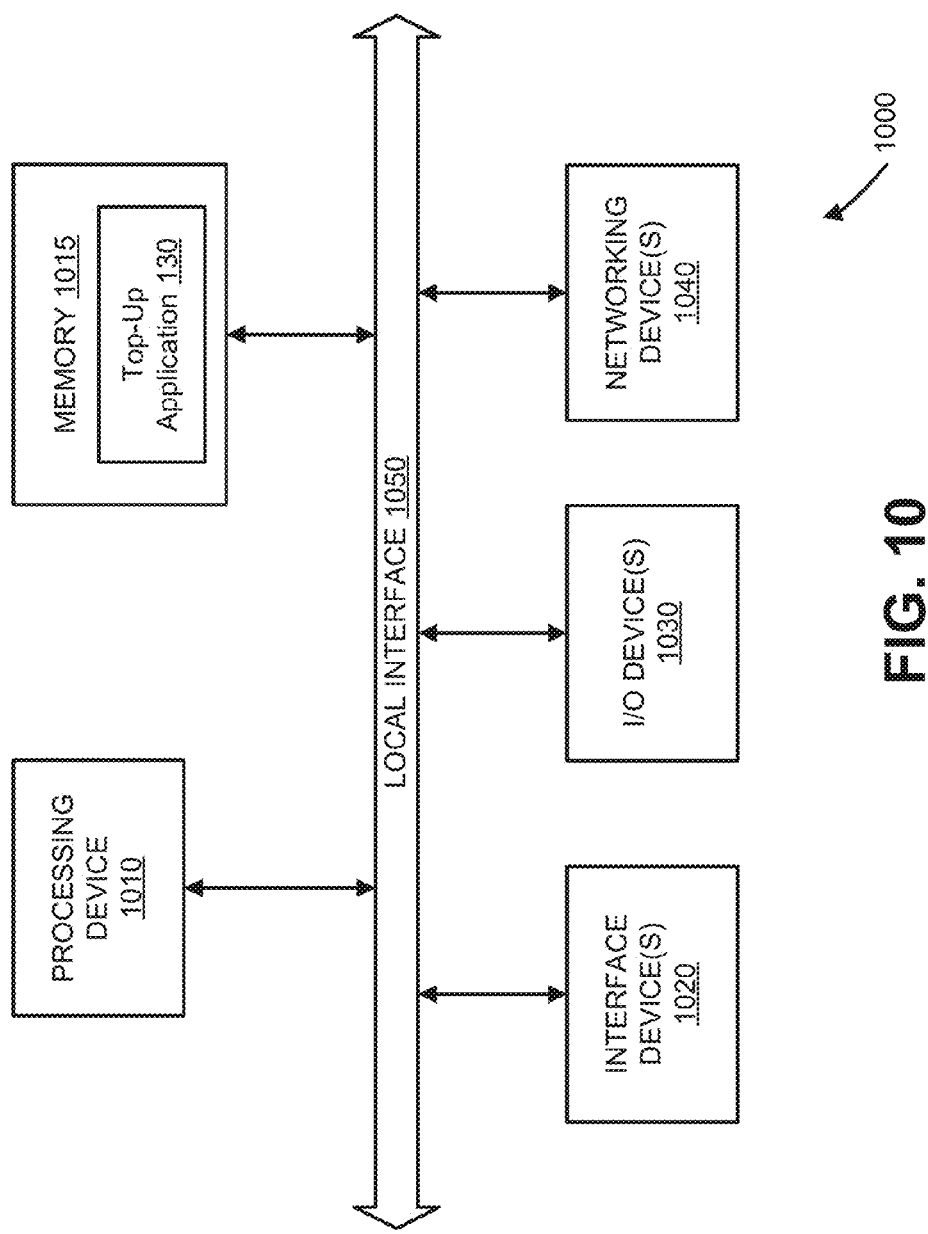

METHODS AND SYSTEMS FOR TELECOMMUNICATION MESSAGING AND REAL-TIME REPLENISHMENT SYSTEMS

CROSS REFERENCE TO RELATED APPLICATIONS

This application is a continuation-in-part of copending U.S. utility application entitled, "METHODS AND SYSTEMS FOR TOP-UP," having Ser. No. 15/238,484, filed on Aug. 16, 2016, which is a continuation of U.S. utility application entitled, "METHODS AND SYSTEMS FOR TOP-UP," having Ser. No. 14/454,668, filed on Aug. 7, 2014, which claims the benefit of U.S. provisional application entitled, "METHODS AND SYSTEMS FOR TOP-UP," having Ser. No. 61/863,407, filed on Aug. 7, 2013, all of which are entirely incorporated herein by reference.

This application claims the benefit of provisional application entitled, "METHODS AND SYSTEMS FOR TELECOMMUNICATION MESSAGING SYSTEMS," having Ser. No. 62/267,451, filed on Dec. 15, 2015, which is entirely incorporated herein by reference.

TECHNICAL FIELD

This disclosure is related to telecommunication messaging and top-up systems (e.g., mobile real time replenishment (RTR) systems). This system uses computing logics programmed in a computing system to send eGfits, top-up, recharge, add, transfer telephone minutes or money to a phone user account, and/or provide electronic messaging that rewards users for staying connected with other users.

BACKGROUND

Top-up systems for phone services having a portal web interface exist today in commerce. Phone users typically provide several information about a phone number in order to top-up, recharge, add, and/or transfer telephone minutes or money. The information includes a telephone number, the country that the telephone number is used in, and the mobile telephone service company that the telephone number is associated with.

Phone services typically include telecommunication messaging system in which many phone users prefer to use over voice calls. In fact, telecommunication messaging system can be used to register voters, such as in Libya, parcel-delivery alerts, real-time notification of credit-debit card purchase confirmation to protect against fraud, and appointment confirmations. The telecommunication messaging system includes text messaging and chatting.

Desirable in the art is an improved telecommunication messaging and top-up system for phone services that would improve upon the conventional telecommunication messaging and top-up system.

SUMMARY

Methods and systems for top-up are provided. A representative telecommunication messaging and real-time replenishment (TMRTR) system includes a user interface that receives a user input and transmits the user input that includes chat message and a recipient phone number associated with a phone user's account; and a real-time replenishment (RTR) gateway that receives and transmits chat messages and the phone number from the user interface and requests for a telephone service company associated with the phone number to a home location register (HLR) look up service. The RTR gateway tops up phone minutes and/or balance of money of the phone user's account associated with the phone number based on the phone number of the received user input, and the determined telephone service company from the HLR look up service.

BRIEF DESCRIPTION OF THE DRAWINGS

The accompanying drawings illustrate preferred embodiments of the invention, as well as other information pertinent to the disclosure, in which:

FIG. 10 is a block diagram that illustrates electrical components in a generic computing device in accordance with an embodiment of the disclosure;

DETAILED DESCRIPTION

Exemplary systems are first discussed with reference to the figures. Although these systems are described in detail, they are provided for purposes of illustration only and various modifications are feasible. After the exemplary systems are described, examples of flow diagrams of the systems are provided to explain the manner in which a phone user provides the phone number and the improved telecommunication messaging and real-time replenishment system can process the eGifts, top-up, recharge, addition, and/or transfer of telephone minutes or money.

Figure 1:
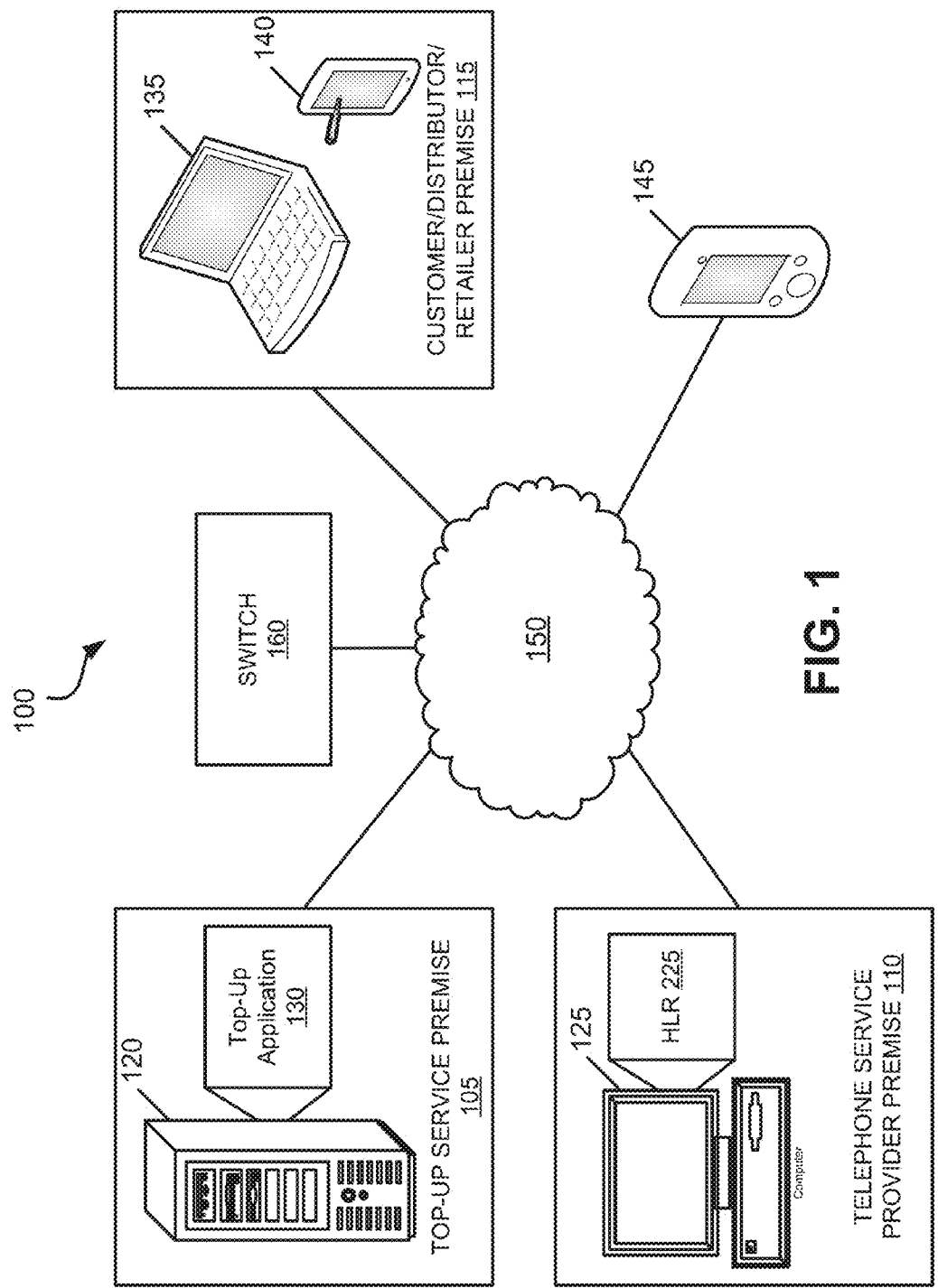
FIG. 1 is a system view of a top-up system in accordance with an embodiment of the disclosure.

Referring to FIG. 1, the top-up system 100 generally includes at least one top-up service premise 105 that can include a top-up server 120, at least one telephone service provider premise 110, at least one switch 160 (e.g., a competitive local exchange carrier (CLEC)), and a customer/distributor/retailer premise 115 that can include a top-up server 120, a laptop 135, and tablets 130, 140, and portable devices 145 that can connect to the Internet. The premises 105, 110, 115 and the portable devices 145 can be connected to a network 150, such as the Internet, telephone network system, and cellular network system.

The top-up server 120 establishes phone calls based on how many minutes and/or how much money a user has in the phone user's account. The top-up server 120 includes a top up application 130 that enables a phone user to top-up phone minutes and/or money on the phone user's account or another phone user's account. The top up application 130 also enables the phone user to transfer phone minutes and money from the phone user's account to another phone user's account. It should be appreciated that although the top up application 130 is shown at the top-up server 120, the top up application 130 entirely or partially can be located anywhere in the top-up system 100, such as that shown in FIG. 1.

It should also be appreciated that the top up application 130 can facilitate processing a top-up and/or a money transfer in at least the following systems: a top-up system 100 using an interactive voice response OR) system, and a pin and fixed denomination platform, which will be described further in connection to FIGS. 3-4; a top-up system 100 using a short message system (SMS), and a pin and fixed denomination platform, which will be described further in connection to FIG. 5; a top-up system 100 using a real time refill (RTR) and select denomination platform, which will be described further in connection to FIG. 6; a top-up system 100 using an interactive application and open denomination platform, which will be described further in connection to FIG. 7; and a top-up system 100 using a mobile wallet, which will be described further in connection to FIGS. 8-9.

Figure 2:
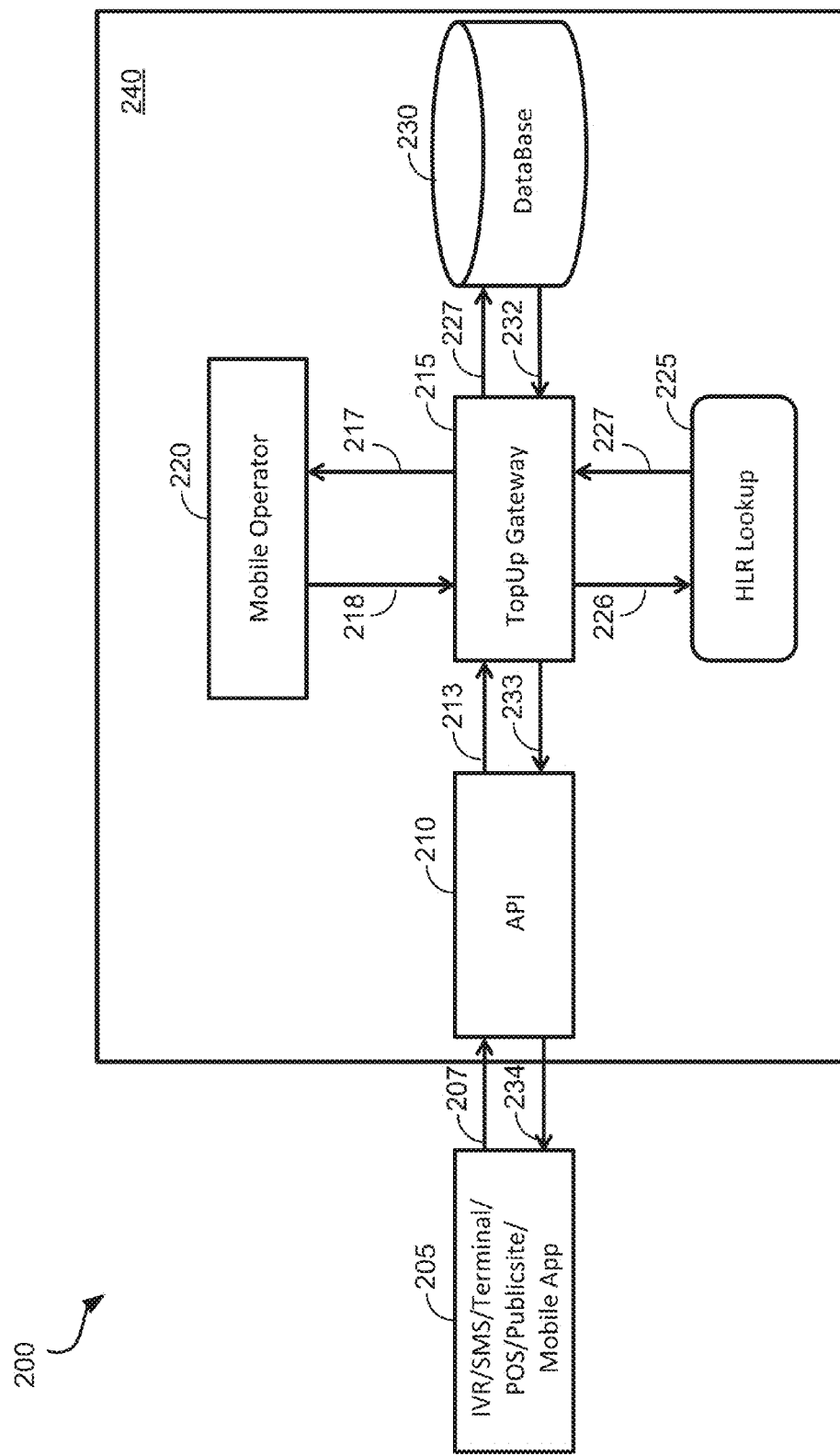
FIG. 2 is a high-level block diagram of a top-up system in accordance with an embodiment of the disclosure.

FIG. 2 is a more detailed block diagram 200 of a top-up system 100 having a top up application 130 in accordance with an embodiment of the disclosure. The top up application 130 receives a request from an interface module 205, such as, a phone user via the IVR, terminal, point of sale (POS), website on the internet, mobile application, etc., for processing a top-up, recharge, addition, and/or transfer of telephone minutes or money to a phone user's account for using a telephone service. The phone user also inputs a phone number associated with the phone user's account or another phone user's account and the number of phone minutes and/or monetary amount for topping up and/or transferring phone minutes and/or money.

At line 207, the top up application 130 communicates with an interactive voice response (IVR) system 240 to initiate an application programming interface (API) 210 that facilitates topping up and/or transferring phone minutes and/or money to a phone user's account. At line 213, the API 210 requests and provides the inputted phone number to a top-up gateway 215 to top-up and/or transfer phone minutes and/or money. At lines 217, 218, 226, 227, the top-up gateway 215 communicates with a home location register (HLR) look up service 225 to determine the telephone service company (e.g., MobiFone™, Telcel™, etc. that provides phone service and/or the geographical location (e.g., Vietnam, Mexico, etc., respectively, associated with the inputted phone number. A mobile (or any telephone service) operator 220 can communicated with the top-up gateway 215 to determine whether how many minutes and/or how much money a user has in the phone user's account. If the user's phone account has minutes and money, the mobile operator 220 provides phone service to phone user's telecommunication device (e.g., smartphone, cellular phone, etc.) that is registered with the phone number associated with the phone user's account.

The top-up gateway 215 verifies whether e phone user's account is a valid phone number having phone minutes and/or amount of money that can be top-up, recharge, add, and/or transfer the phone minutes and/or money into the phone user's account. The phone user can also top-up, recharge, add, and/or transfer the phone minutes and/or money from a purchased pin-based card into the phone user's account. Responsive to the top-up gateway 215 verifying that the phone user's account and/or the purchased pin-based card having a valid number of phone minutes and/or amount of money and obtaining information from the HLR lookup service 225 based on the inputted phone number, the top-up gateway 215 at lines 227, 232 tops up, recharges, adds, and/or transfers the phone minutes and/or money to a phone user's account associated with the inputted phone number and stores this information at a database 230 based on the phone number, and determined telephone service company.

The top up of phone minutes and/or money to the phone user's account can be accomplished by way of credit card, transfer of balance from one phone user's account to another phone user's account and pin-based calling card, among others. The top-up gateway 215 provides confirmation of the top-up, recharge, addition, and/or transfer of the phone minutes and/or money to the phone user via the API 210 and block 205 through lines 233, 234.

Alternatively or additionally, the top-up application 130 can notify the phone user whether the inputted phone number is new or previously inputted based on the phone user's historical inputted phone numbers. Alternatively or additionally, the top-up gateway 215 at lines 227, 232 tops up, recharges, adds, and/or transfers the phone minutes and/or money to a phone user's account associated with the inputted phone number and stores this information at a database 230 based on the phone number, determined telephone service company, and determined geographical location.

Figure 3:
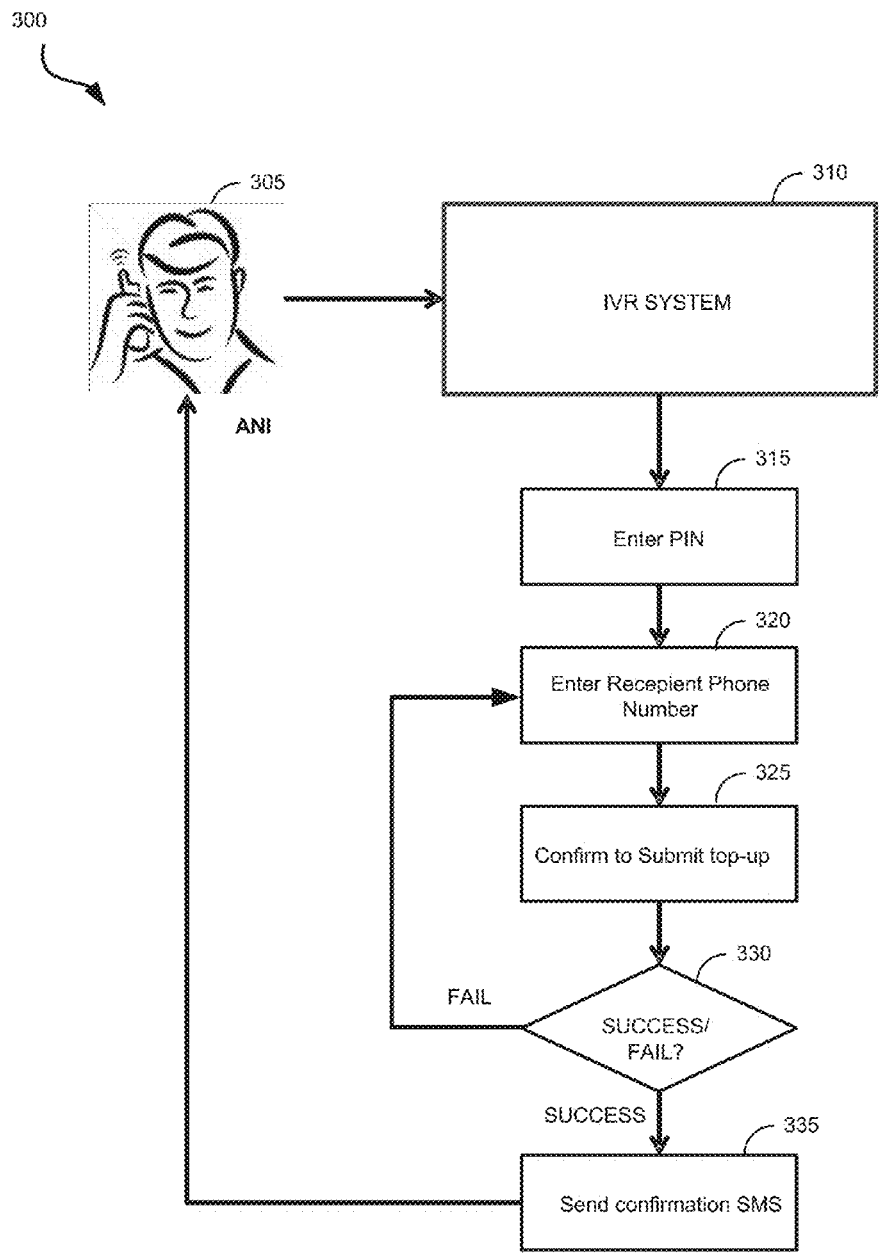
FIG. 3 is a flowchart for processing a top-up in a top-up system using an interactive voice response (IVR) system, and a pin and fixed denomination platform in accordance with an embodiment of the disclosure.

FIG. 3 is a flowchart 300 for processing a top-up in a top-up system 100 using an interactive voice response (IVR) system 310, and a pin and fixed denomination platform in accordance with an embodiment of the disclosure. A phone user 305 purchases a pin-based calling card that provides the phone user with a certain number of phone minutes or monetary amount. The phone user 305 calls an auto international top-up access number to interact with an IVR system 310 to start the top-up process. During the interaction, the IVR system 310 can determine an automatic number identification (ANI) from a calling number of the phone user 305. The IVR system 310 provides instructions to the phone user 305, which include instructing the phone user 305 to input a pin number for confirmation of the purchased pin-based calling card and input a recipient's phone number with a country code in accordance to an E.164 format, for example.

At blocks 315 and 320, the phone user inputs the pin number of the purchased pin-based calling card and the recipient's phone number, respectively. At block 325, the phone user 305 confirms the inputted information with the IVR system 310. At block 330, the IVR system 310 receives the submission from the phone user 305, confirms the pin number of the pin-based calling card, and processes the top-up that were previously described in connection to FIG. 2 based on the determined telephone service company associated with the recipient's phone number. If the top-up process is successful or unsuccessful, the IVR system 310 at block 335 can notify the phone user 305 of the successful or unsuccessful top-up via an audio message over the telephone and/or a SMS message.

Figure 4A:
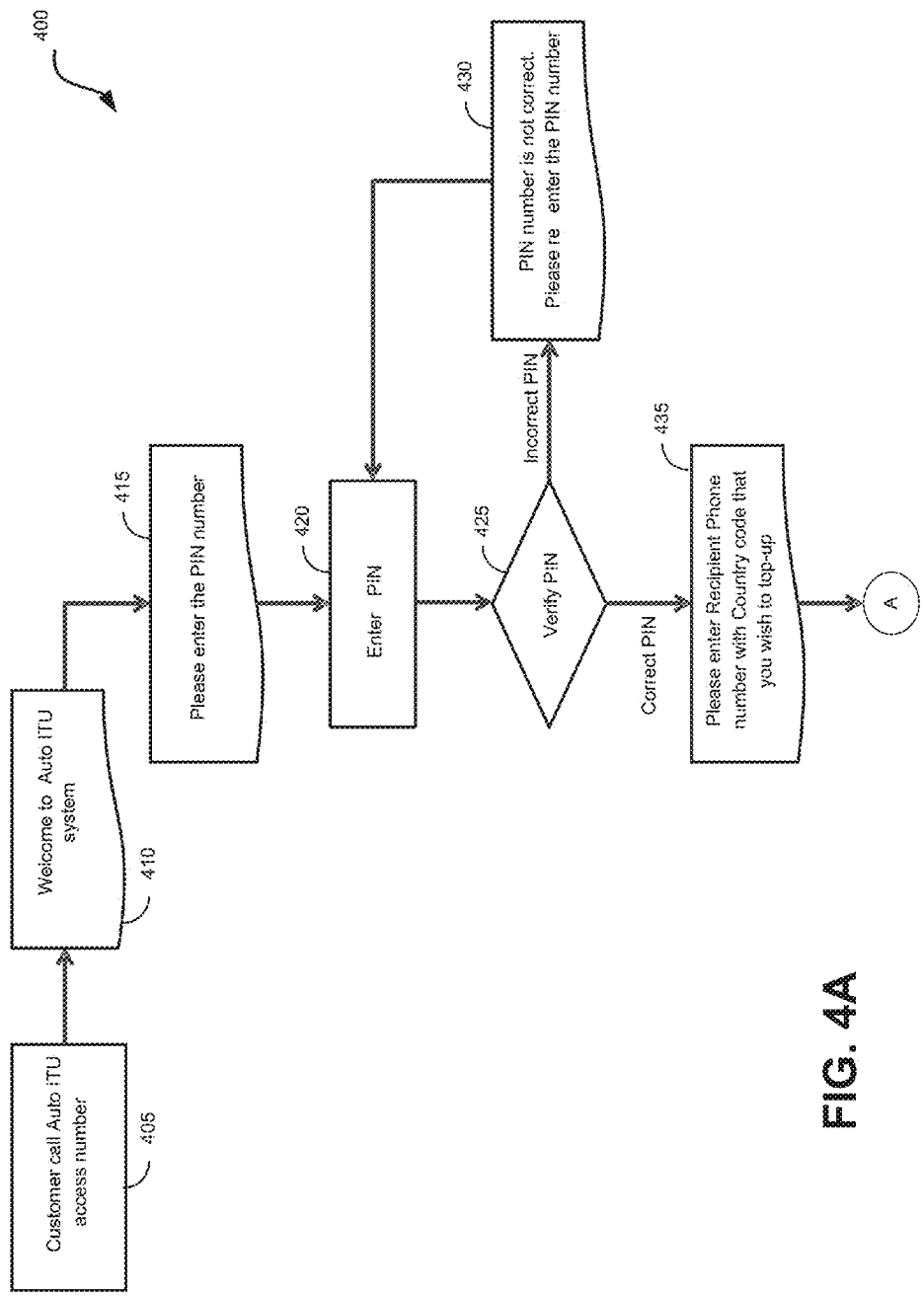
FIGS. 4A-B are more detailed flowcharts for processing a top-up in a top-up system using an interactive voice response (IVR) system, and a pin and fixed denomination platform in accordance with an embodiment of the disclosure.
Figure 4B:
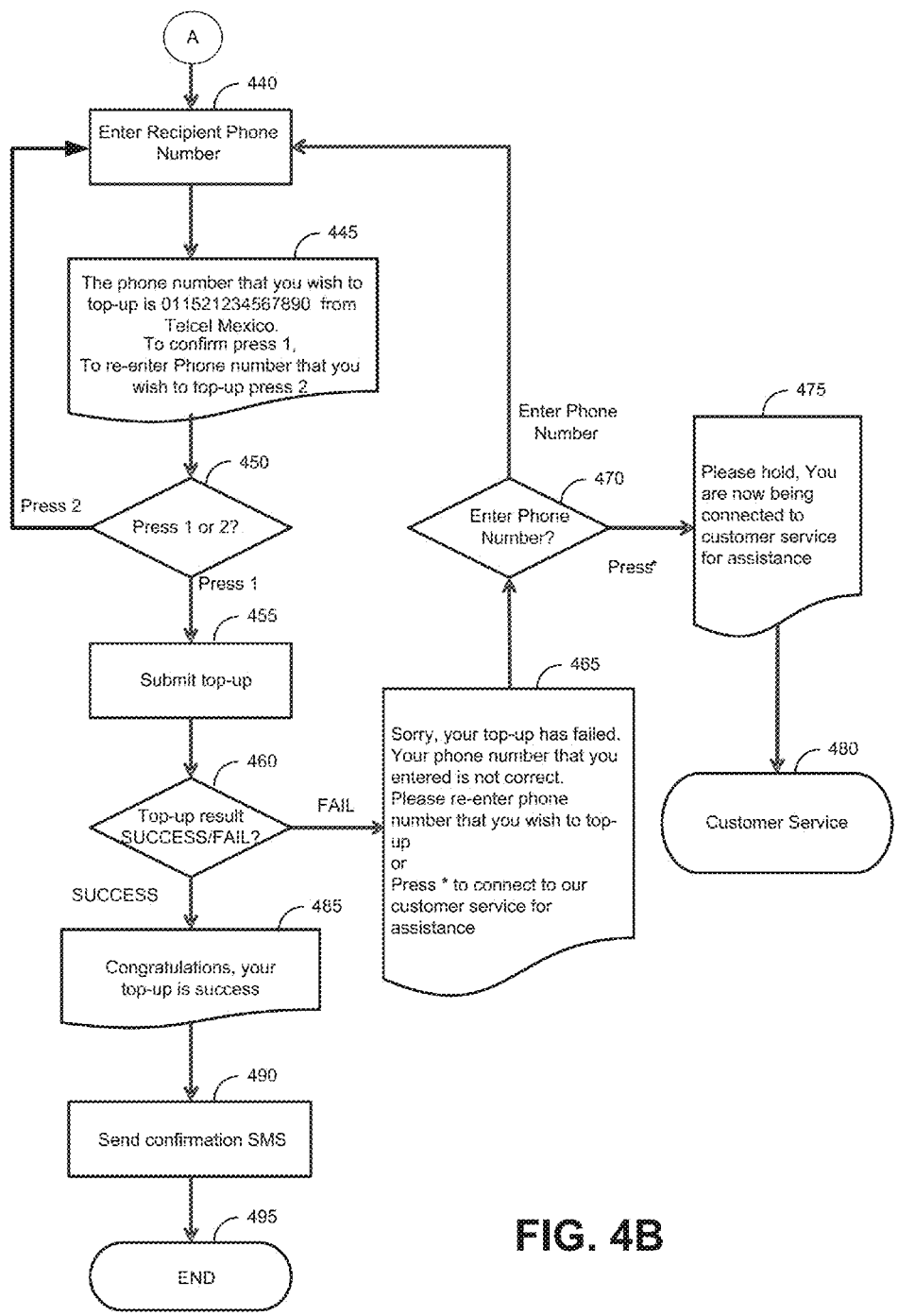

FIG. 4 is a more detailed flowchart 400 for processing a top-up in a top-up system 100 using an interactive voice response (IVR) system, and a pin and fixed denomination platform, such as that shown in FIG. 3. Referring to FIG. 4A and beginning with block 405, the phone user 305 calls an auto international top-up access number to interact with an IVR system 310 to start the top-up process. At blocks 410 and 415, the IVR system 310 welcomes the phone user 305 to the auto international top-up system, and requests for the pin umber of the purchased pin-based calling card, respectively. At blocks 420 and 425, the phone user 305 inputs the pin number of the purchased pin-based calling card, and the IVR system 310 verifies the pin number, respectively. Responsive to verifying the pin number to be incorrect, the IVR system 310 at block 430 notifies the phone user over the telephone that the pin number is incorrect and to re-enter the pin number. At this point, the top-up process repeats blocks 420 and 425 until the verification of the pin number is correct.

Responsive to verifying the pin number to be correct, the TYR system 310 request the phone user 305 to input the recipient's phone number with the country code that the phone user wish to top-up. At block 440 in FIG. 4B, the phone user 30 enters the recipient's phone number. At block 445, the IVR system 310 confirms the inputted information with the phone user 305 by playing an audio confirmation message. For example, during a telephone IVR session, the IVR system 310 can request the user to press the number 1 on his phone responsive to the playback of the recipient's phone number is correct. Responsive to the phone user 305 pressing number 2 on his phone, the top-up process repeats blocks 435, 440, and 445.

Responsive to the phone user 305 pressing number 1 on his phone, the phone user 305 submits a number of phone minutes or a monetary amount to the IVR system 310 to be topped up at the recipient's phone number. The IVR system 310 processes the top-up that were previously described in connection to FIG. 2 based on the determined telephone service company associated with the recipient's phone number. If the top-up process is successful or unsuccessful, the IVR system 310 at block 335 can notify the phone user 305 of the successful or unsuccessful top-up via an audio message over the telephone and/or a SMS message. If the top-up process is successful, the IVR system 310 at block 485 can notify the phone user 305 of the successful top-up via an audio message over the telephone. At block 490, the IVR system 310 can send a SMS message notifying the phone user 305 of the successful top-up.

If the top-up process is unsuccessful, the IVR system 310 at block 465 can notify the phone user 305 of the unsuccessful top-up via an audio message over the telephone and request for re-retry of the recipient's phone number or press "*" to connect to a customer service representative for further support. At block 470, the IVR system 310 determines whether the phone user 305 presses "*" or the recipient's phone number. Responsive to the phone user 305 pressing the recipient's phone number, the top-up process repeats blocks 440, 445, 450, 455, and 460. Responsive to the phone user 305 pressing "*" on his phone, the IVR system 310 connects the phone user 305 to a customer service representative at blocks 475 and 480.

Figure 5:
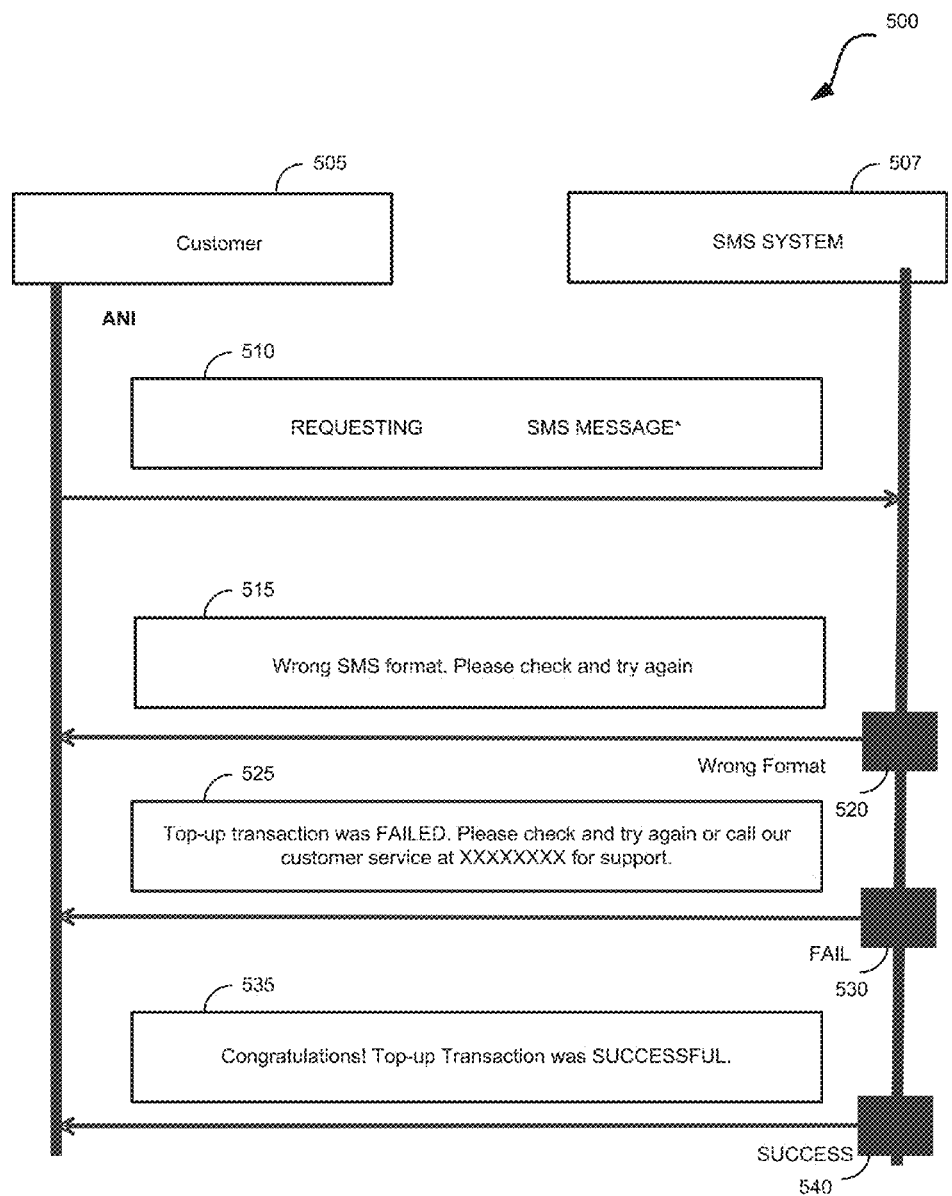
FIG. 5 is a flowchart for processing a top-up in a top-up system using a short message system (SMS), and a pin and fixed denomination platform in accordance with an embodiment of the disclosure.

FIG. 5 is a flowchart 500 for processing a top-up in a top-up system 100 using a short message system (SMS) 507, and a pin and fixed denomination platform in accordance with an embodiment of the disclosure. A customer 505 can request for a top-up to a recipient's phone number using a SMS system 507. The customer 505 can request for a top-up by entering atop-op format in the SMS message. The top-up format can include a pin number, a recipient's phone number, and a space in between the numbers, or a top-up command code, a pin number, a recipient's phone number, and spaces in between the code and numbers.

At block 520, the SMS system 507 can determine whether the top-up format is correct or wrong. At block 515, responsive to the SMS system 507 determining that the top-up format is wrong, the SMS system 507 notifies the user that the SMS format is wrong, requests the customer 505 to check the SMS format and try again. At block 530, responsive to determining that the SMS format is correct, the SMS system 507 can determine whether the top-up transaction was successful or not is correct or wrong. At block 525, responsive to the SMS system 507 determining that the top-up transaction failed, the SMS system 507 notifies the user that the top-up transaction has failed and requests the customer 505 to try again or call customer service for further support, such as that shown in block 525. At block 535, the SMS system 507 processes the top-up that were previously described in connection to FIG. 2 based on the determined telephone service company associated with the recipient's phone number. Responsive to the SMS system 507 determining that the top-up transaction was successful, the SMS system 507 notifies the user that the top-up transaction was successful, such as that shown in block 535.

Figure 6:
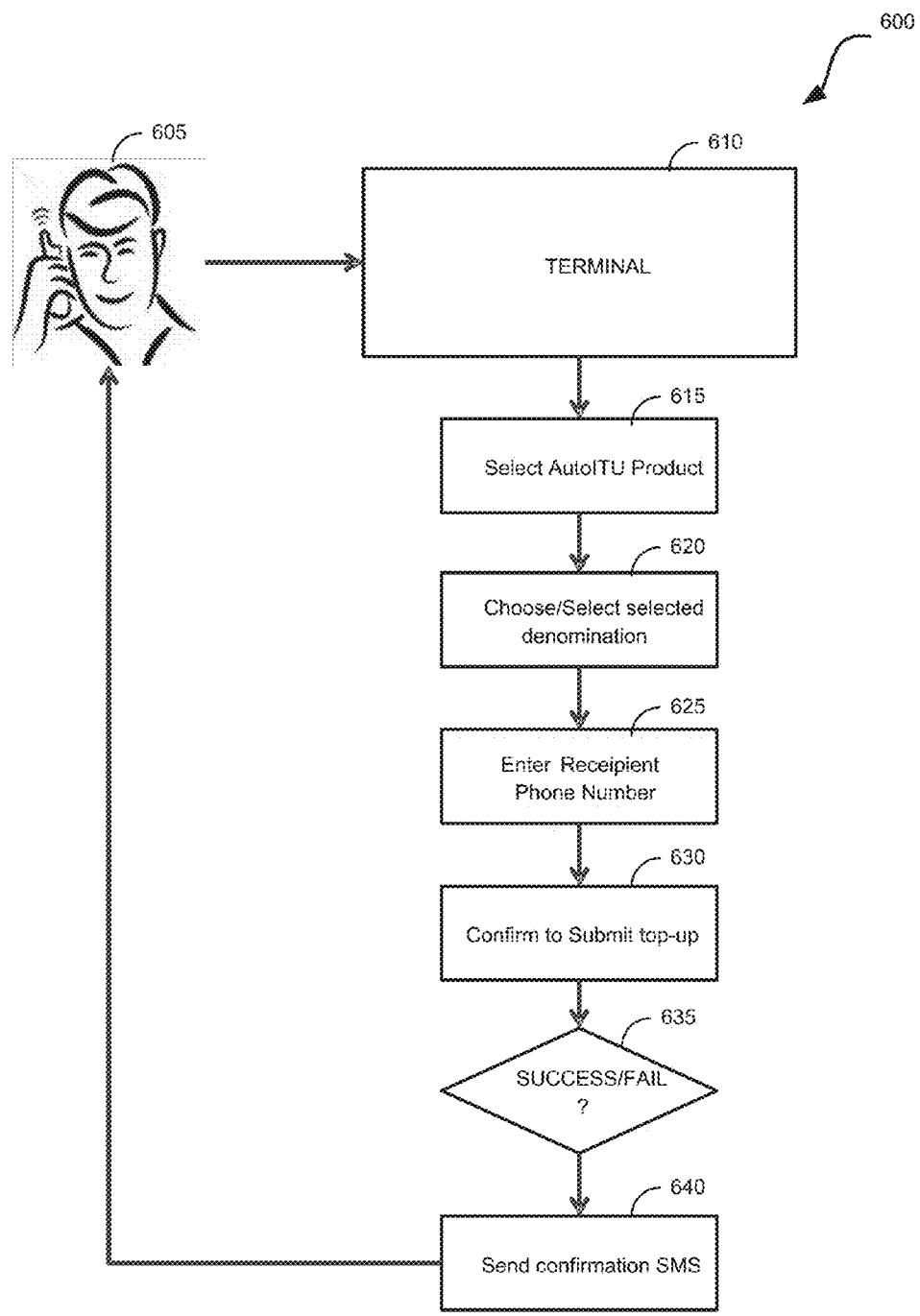
FIG. 6 is a flowchart for processing a top-up in a top-up system using a real time refill (RTR) and select denomination platform in accordance with an embodiment of the disclosure.

FIG. 6 is a flowchart 600 for processing a top-up in a top-up system 100 using a real time refill (RTR) and select denomination platform in accordance with an embodiment of the disclosure. A phone user 605 accesses a phone user's account using a terminal 610 to start a top-up transaction. The phone user's account is assumed to have a certain number of phone minutes or monetary amount. At block 615, the phone user 605 selects an auto international top-up product displayed on the terminal 610. During the interaction at the terminal 610, the phone user 605 at block 620 can select a predetermined denomination (e.g., $5, $10, $15, $20, or $50) displayed on the terminal that the phone user 605 wishes to top-up.

At block 625, the terminal 610 can prompt the phone user 305 to input a recipient's phone number with a country code in accordance to an E.164 format. At block 630, the terminal 610 can display a confirmation screen displaying the selected denomination and the inputted recipient's phone number so that the phone user 605 can confirm that the information is correct. At block 635, responsive to the phone user 605 confirming that the information is correct, the terminal 610 receives the submission from the phone user 605 and processes the top-up that were previously described in connection to FIG. 2 based on the determined telephone service company associated with the recipient's phone number. If the top-up process is successful or unsuccessful, the terminal 610 at block 640 can notify the phone user 305 of the successful or unsuccessful top-up via a screen message on the terminal 610 and/or a SMS message.

Figure 7:
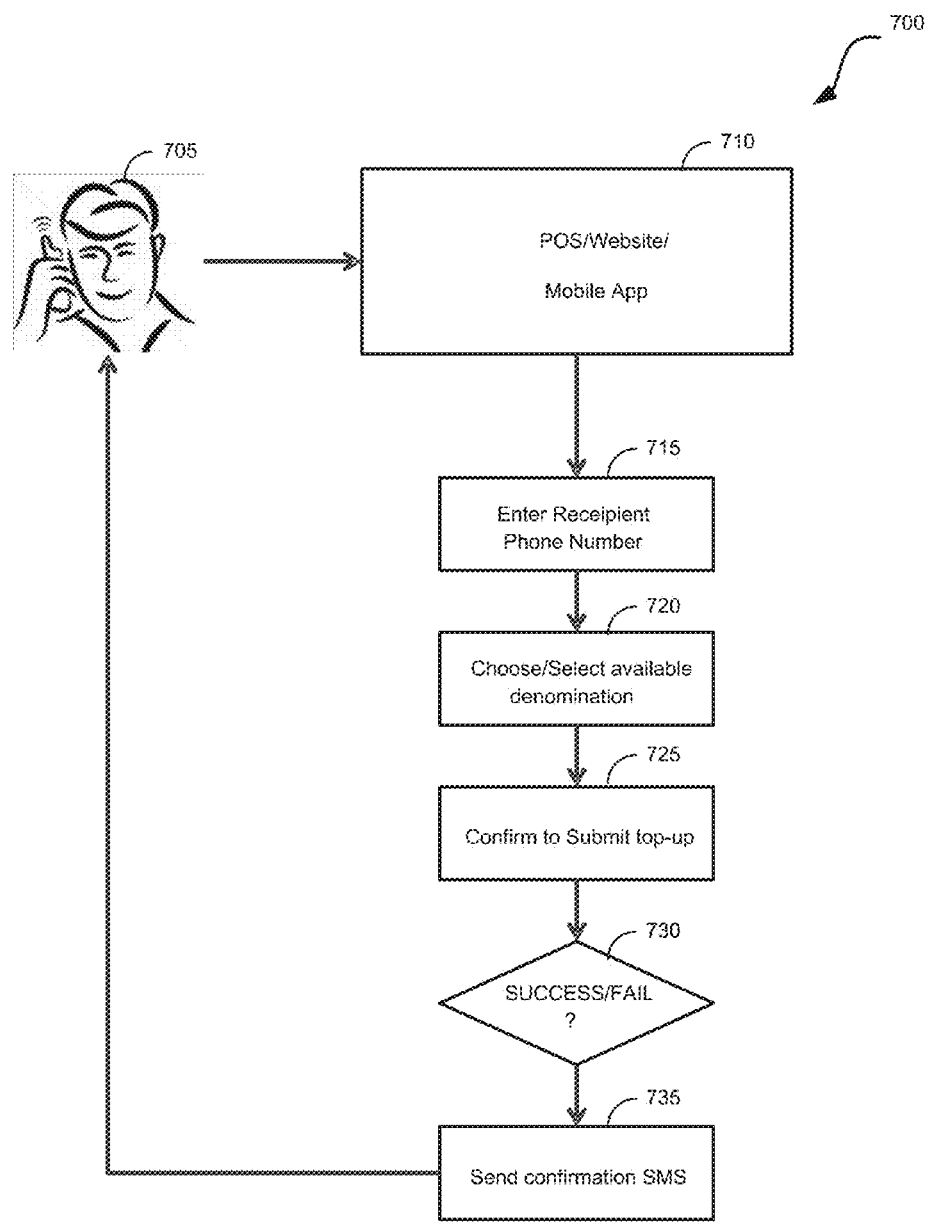
FIG. 7 is a flowchart for processing a top-up in a top-up system using an interactive application and open denomination platform in accordance with an embodiment of the disclosure.

FIG. 7 is a flowchart 700 for processing a top-up in a top-up system 100 using an interactive application 710 (e.g., a point of sale device, a website, or a mobile application) and open denomination platform in accordance with an embodiment of the disclosure. A phone user 705 accesses a phone user's account using the interactive application 710 to start top-up transaction. The phone user's account has a certain number of phone minutes or monetary amount. During the interaction with the interactive application 710, the interactive application 710 at block 715 can prompt the phone user 705 to input a recipient's phone number with a country code in accordance to an E.164 format.

The phone user 705 at block 720 can select any denomination (e.g., $1-$500) that the phone user 705 wishes to top-up. The interactive application 710 at block 725 can display a confirmation screen displaying the selected denomination and the inputted recipient's phone number so that the phone user 705 can confirm that the information is correct. Responsive to the phone user 705 confirming that the information is correct, the interactive application 710 at block 730 receives the submission from the phone user 605 and processes the top-up that were previously described in connection to FIG. 2 based on the determined telephone service company associated with the recipient's phone number. If the top-up process is successful or unsuccessful, the interactive application 710 at block 735 can notify the phone user 705 of the successful or unsuccessful top-up via a screen message on the interactive application 710 and/or a SMS message.

Figure 8A:
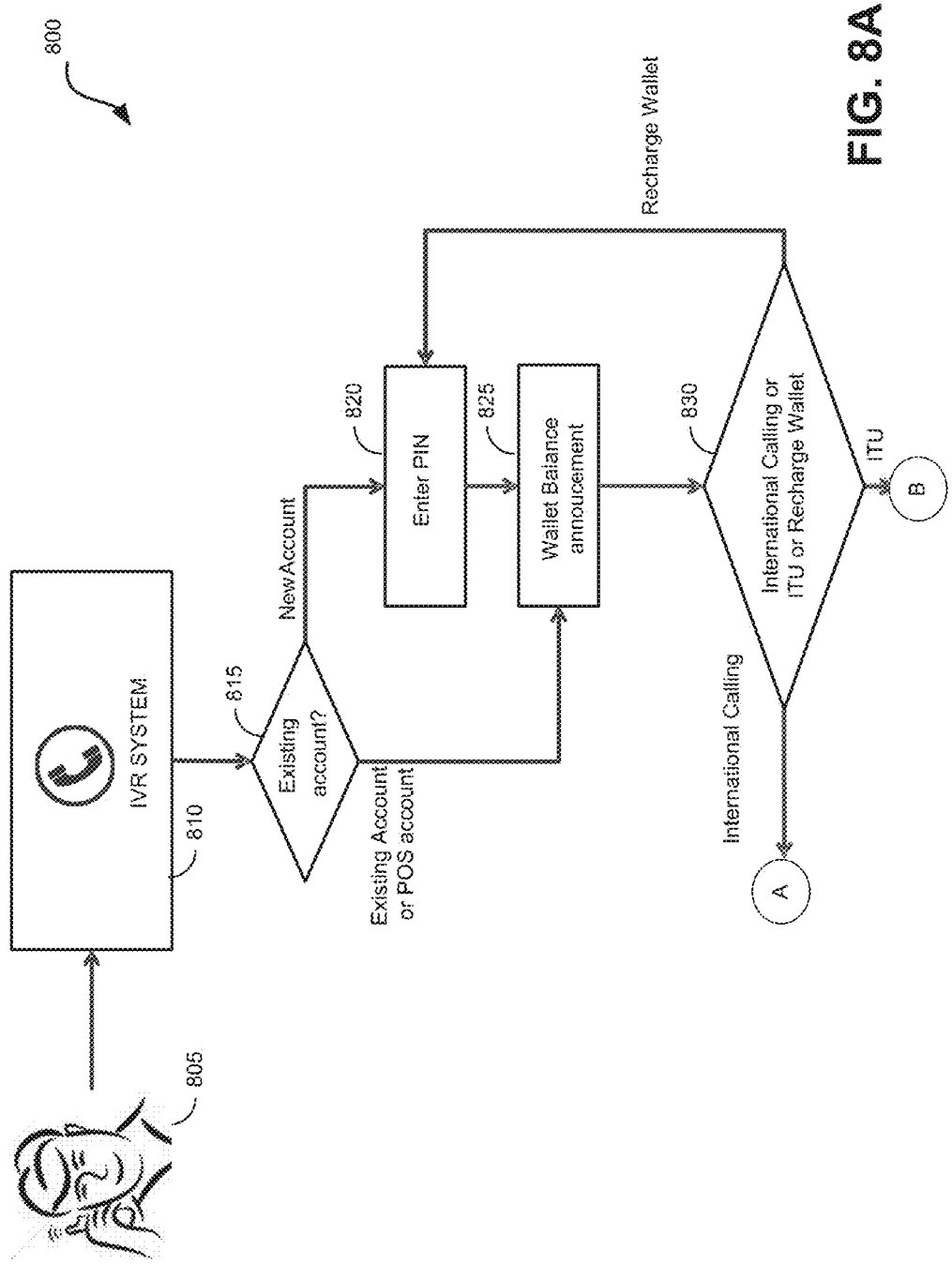
FIGS. 8A-B are flowcharts for processing a top-up and/or a money transfer in a top-up system using a mobile wallet in accordance with an embodiment of the disclosure.
Figure 8B:
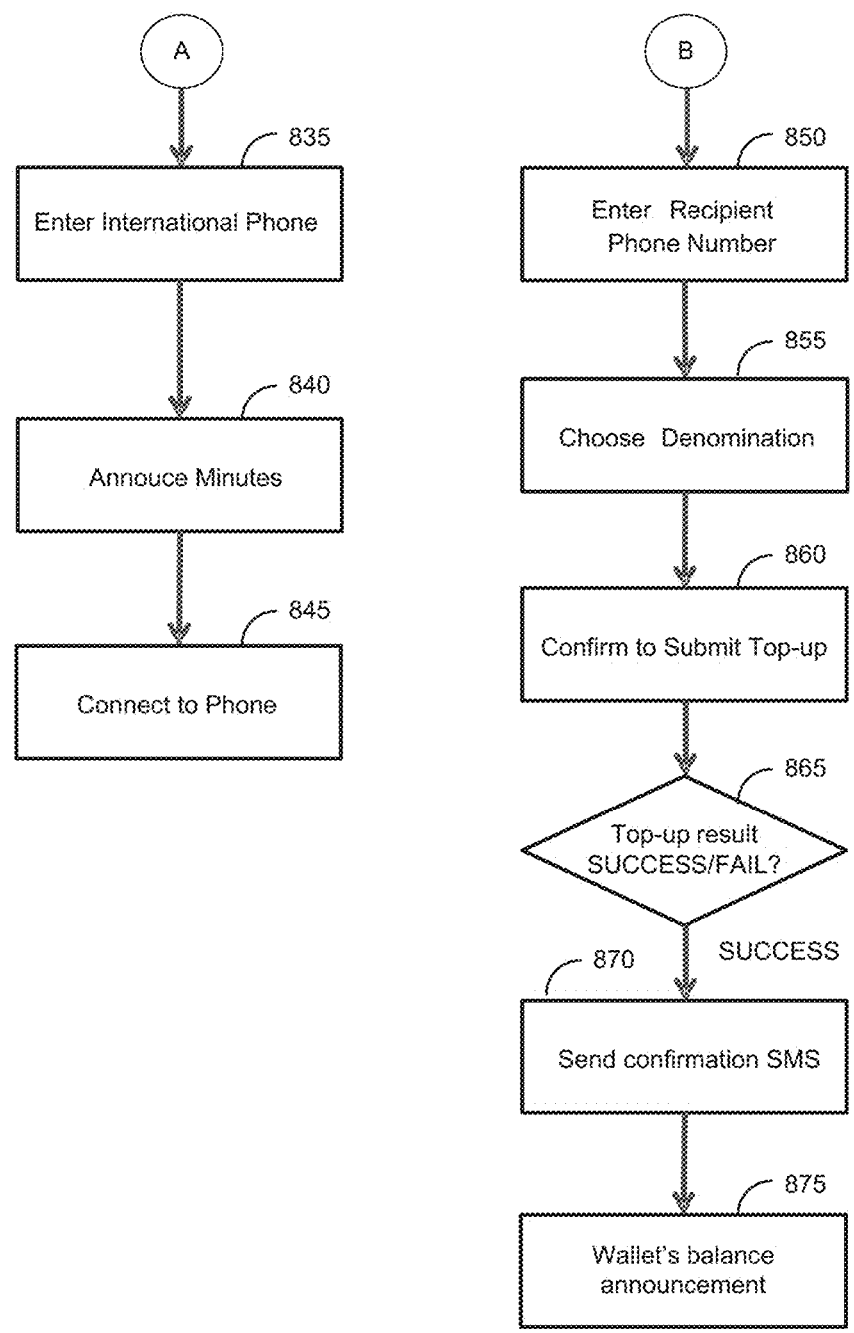

FIG. 8 is a flowchart 800 for processing a top-up and/or a money transfer in a top-up system 100 using a mobile wallet in accordance with an embodiment of the disclosure. A phone user 805 calls an access number to start a top-up or transfer transaction. The IVR system 810 at block 815 can determine an ANI Number and verify whether an ANI account exists or not. Responsive to determining that the phone user 805 will need to create a new account, the IVR system 810 at block 820 can request the phone user 805 to enter his pin number. Responsive to the IVR system confirming the pin number or determining that the phone user 805 has an existing account or POS account, the IVR system at block 825 provides a balance amount on the mobile wallet and at block 830 requests for transaction commands, such as call a phone number, or recharge a recipient's phone number/another user's mobile wallet. Responsive to selecting the option of calling a phone number, the IVR system at blocks 835, 840, 845 requests the phone user 805 to enter the outbound phone number, provides the number of phone minutes remaining on the ANI account, and connects the phone user 805 to the outbound phone number.

Responsive to the phone user 805 selecting the option of recharging a recipient's phone number, the IVR system at blocks 850 and 855 requests the phone user 805 to enter the recipient's phone number and chooses a denomination that the phone user 805 wishes to top-up. The IVR system at block 860 confirms with the phone user 805 the submitted information associated with the top-up transaction. Responsive to the phone user 805 confirming that the information is correct, the IVR system at block 865 receives the submission from the phone user 805 and processes the top-up that were previously described in connection to FIG. 2 based on the determined telephone service company associated with the recipient's phone number. If the top-up transaction is successful or unsuccessful, the IVR system at block 870 can notify the phone user 805 of the successful or unsuccessful top-up via an audio message and/or a SMS message. The IVR system at 875 can provide the remaining balance on the mobile wallet.

Figure 9A:
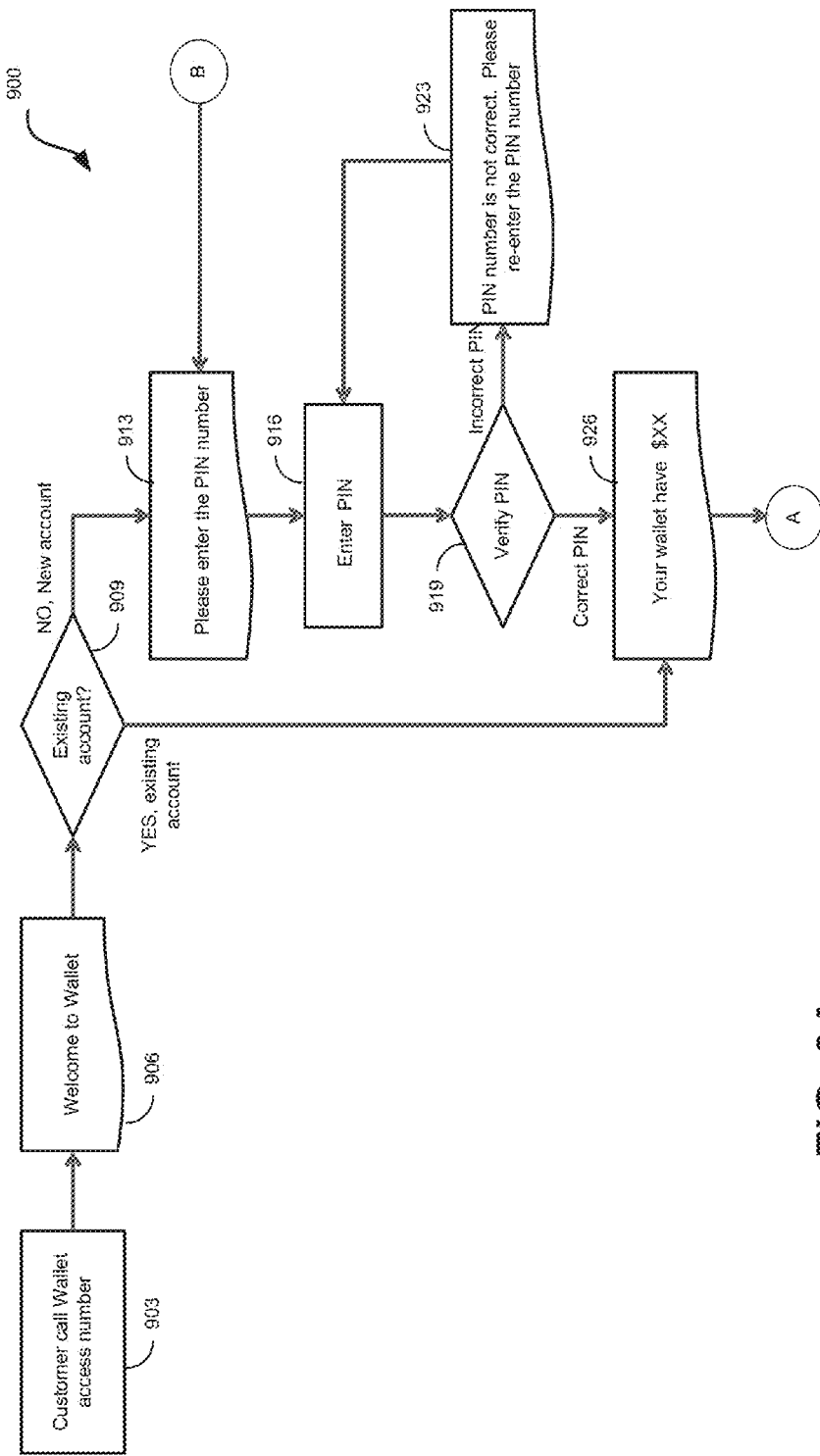
FIGS. 9A-C are more detailed flowcharts for processing a top-up and/or a money transfer in a top-up system using a mobile wallet in accordance with an embodiment of the disclosure.
Figure 9B:
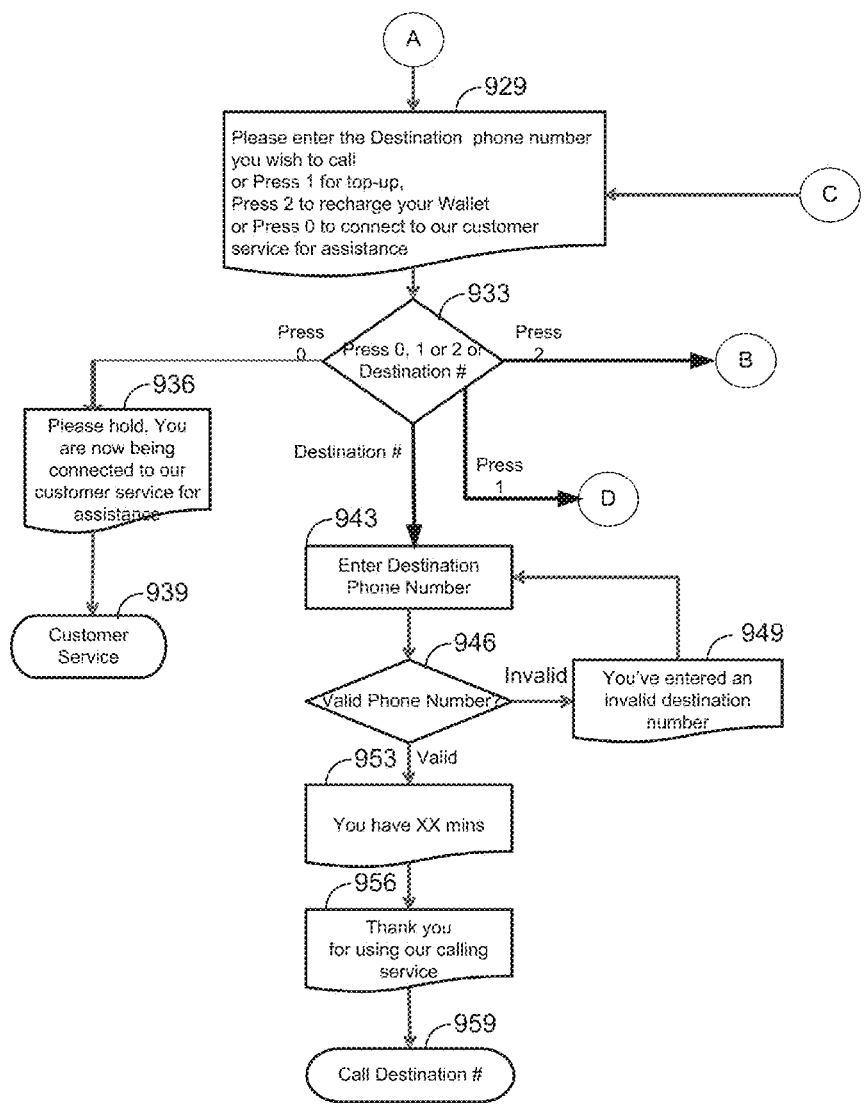
Figure 9C:
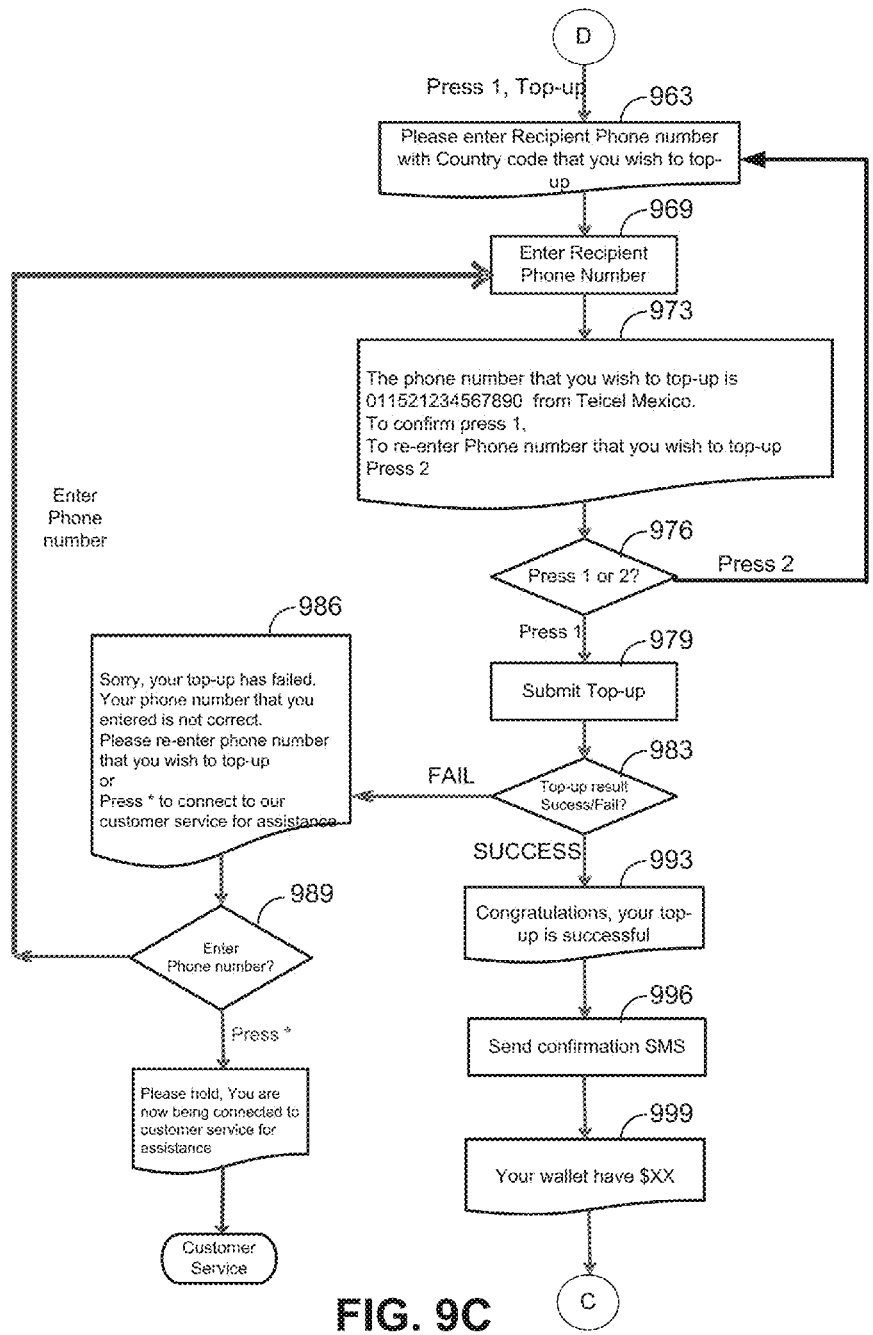

FIG. 9 is a more detailed flowchart 900 for processing a top-up and/or a money transfer in a top-up system 100 using a mobile wallet in accordance with an embodiment of the disclosure. At block 903, a phone user 805 calls an access number to start a top-up or transfer transaction. At block 906, the IVR system welcomes the phone user to the mobile wallet product. At block 909, the IVR system can determine an ANI Number and verify whether an ANI account exists or not. The IVR system can provide instructions to the phone user 805, including requesting the phone user 805 to enter his pin number at block 913. At block 916, the phone user enters the pin number and at block 919, the IVR system verifies the pin number. At block 923, responsive to the IVR system determining that the pin number is incorrect, the IVR system requests the phone user to re-enter the pin number and repeats blocks 916 and 919.

Responsive to the IVR system confirming that the pin number is correct, the IVR system at block 926 provides a balance amount on the mobile wallet and at block 929 requests for transaction commands, such as enter a destination phone number, press "1" to recharge a recipient's phone number, press "2" to recharge the phone user's mobile wallet or press "0" for customer service. At block 933, the IVR system determines the selected transaction commands. Responsive to selecting customer service, the IVR system at blocks 936 and 939 connects the phone user to a customer service representative. Responsive to selecting the option of calling a phone number, the phone user 805 at block 943 inputs a destination phone number to the IVR system. At block 946, the IVR system verifies whether the phone number is valid. Responsive to verifying that the phone number is invalid, the IVR system notifies the phone user of the invalid destination phone number at block 949 and repeats blocks 943 and 946. Responsive to verifying that the phone number is valid, the IVR system provides the number of phone minutes remaining on the ANI account, and connects the phone user 805 to the destination phone number at blocks 956 and 959.

Responsive to the phone user 805 selecting the option of recharging a recipient's phone number, the IVR system at block 963 requests the phone user to enter the recipient's phone number. At block 969, the phone user inputs the recipient's phone number into the IVR system. At block 973, the IVR system confirms the inputted recipient's phone number with the phone user, such as that shown in blocks 973 and 976. At block 979, the phone user submits a denomination that the phone user 805 wishes to top-up. At block 983, the IVR system receives the submission from the phone user 805 and processes the top-up that were previously described in connection to FIG. 2 based on the determined telephone service company associated with the recipient's phone number. If the top-up transaction is successful, the IVR system at block 993 can notify the phone user 805 of the successful top-up via an audio message and at block 996, send a SMS successful confirmation message. At block 999, the IVR system can provide the remaining balance on the mobile wallet and repeat the process at block 929. If the top-up transaction is unsuccessful, the IVR system at blocks 986 and 989 can notify the phone user 805 of the unsuccessful top-up via an audio message, request the phone user to enter the recipient's phone number, and repeat blocks 969, 973, 976, 979, and 983.

FIG. 10 is a block diagram illustrating an exemplary architecture for a generic computer 1000 that is similar to the architecture of the imputing devices 120, 125, 135, 140, 145, such as that shown in FIG. 1. As indicated in FIG. 10, the generic computer 1000 comprises a processing device 1010, memory 1015, one or more user interface devices 1020, one or more I/O devices 1030, and one or more networking devices 1040, each of which is connected to a local interface 1050. The processing device 1010 can include any custom made or commercially available processor, a central processing unit (CPU) or an auxiliary processor among several processors associated with the generic computer 1000, a semiconductor based microprocessor (in the form of a microchip), or a microprocessor. The memory 1015 can include any one or a combination of volatile memory elements (e.g., random access memory (RAM, such as DRAM, SRAM, etc.)) and nonvolatile memory elements (e.g., ROM, hard drive, tape, CDROM, etc.)

The one or more user interface devices 1020 comprise those components with which the user (e.g., administrator) can interact with the generic computer 1000. Where the generic computer 1000 comprises a server computer or similar device, these components can comprise those typically used in conjunction h a PC such as a keyboard, mouse, keypad, and terminal.

The one or more I/O devices 1030 comprise components used to facilitate connection of the generic computer 1000 to other devices and therefore, for instance, comprise one or more serial, parallel, small system interface (SCSI), universal serial bus (USB), or IEEE 1394 (e.g., Firewire™) connection elements. The networking devices 1040 comprise the various components used to transmit and/or receive data over networks 150, where provided. By way of example, the networking devices 1040 include a device that can communicate both inputs and outputs, for instance, a modulator/demodulator (e.g., modem), a radio frequency (RF) or infrared (IR) transceiver, a telephonic interface, a bridge, a router, as well as a network card, etc.

The memory 1015 normally comprises various programs software and/or firmware) including an operating system (O/S). The O/S controls the execution of programs, and provides scheduling, input/output control, file and data management, memory management, and communication control and related services. The memory 1015 further includes a calling setup application 225 that facilitates setting up an assigned number to call a calling number.

Figure 11:
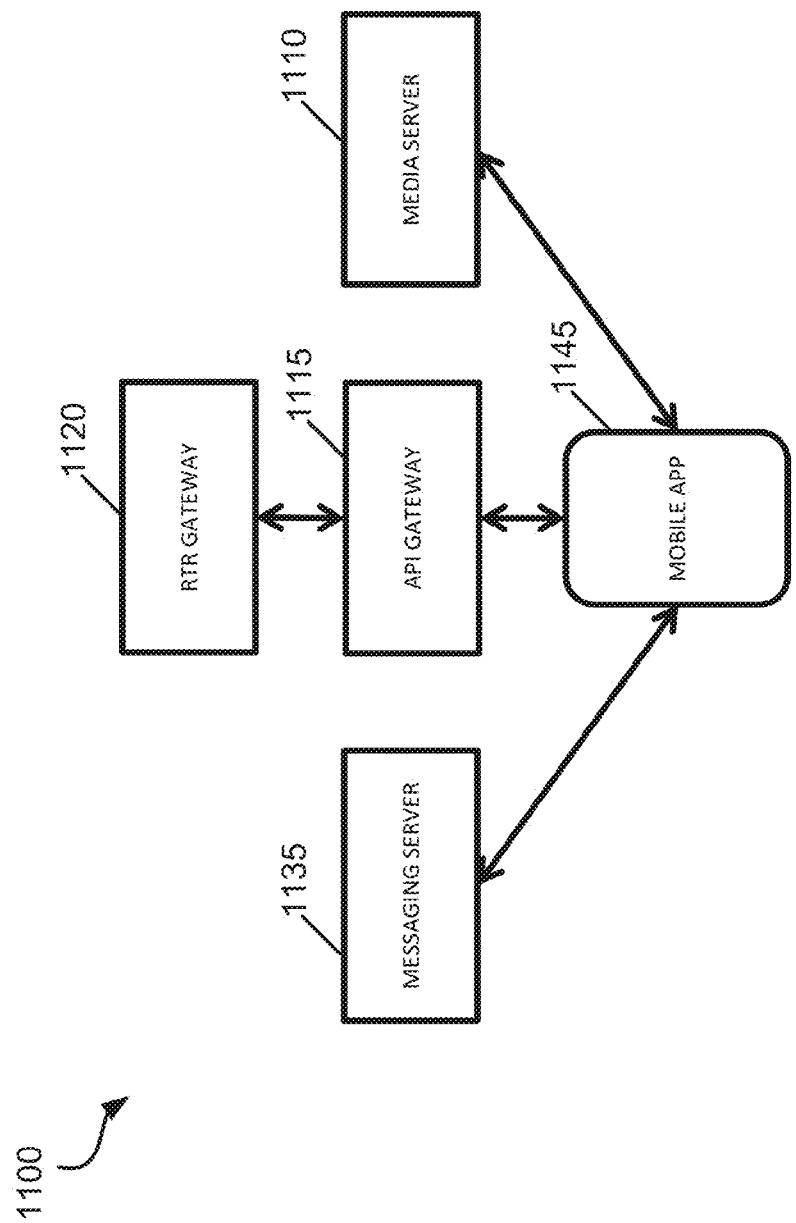
FIG. 11 is a system view of a telecommunication messaging and real-time replenishment system (TMRTR) in accordance with an embodiment of the disclosure.

Referring to FIG. 11, the telecommunication messaging and real-time replenishment system ("TMRTR") 1100 generally includes a media server 1110, an application program interface ("API") 1115, a real-time replenishment ("RTR") gateway 1120, a messaging server 1135, and a mobile application 1145, all of which can be connected to a network (not shown), such as the Internet, local area network, and wide area network.

The mobile application 1145 provides functionalities on a mobile device that enables a user to text, call, video call, and earn rewards as well as send eGift and recharge prepaid mobile (yours someone else's) through a chat feature. e-gifts can include, but not limited to, eGift cards, electronic music and video contents, electronic books, electronic tickets (e.g., shows, museums, sporting events, movies, etc.), and any other online gifts. The media server 1110 facilitates processing requests from the mobile application 1145 relating to the voice communications and video communications. The media server 1110 facilitates establishing video/voice communications (e.g., voice and video calls), preferably through the Internet, based on how many minutes a user has bought.

The API gateway 1115 facilitates processing requests from the mobile application 1145 relating to the following: orders, user's account, rewards (V-coins), products (top up, eGift top up, voice calls), payments, HLR lookup and notification. The API gateway 1115 can track and apply reward points such as v-coins (further described below). The API gateway 1115 is further described in FIGS. 22-26. The messaging server 1135 facilitates processing requests from the mobile application 1145 relating to the text communications and chat communications. The messaging server 1135 is further described in FIG. 14. The RTR gateway 1120 can include the top-up gateway 215 (FIG. 2) and can facilitate processing requests from the API gateway 1115 related to an eGift to be transferred to a phone user's account and a top-up, recharge, addition, and/or transfer of telephone minutes or money to a phone user's account for using voice and/or video communications. The RTR gateway 1120 is further described in FIGS. 13-16.

Figure 12:
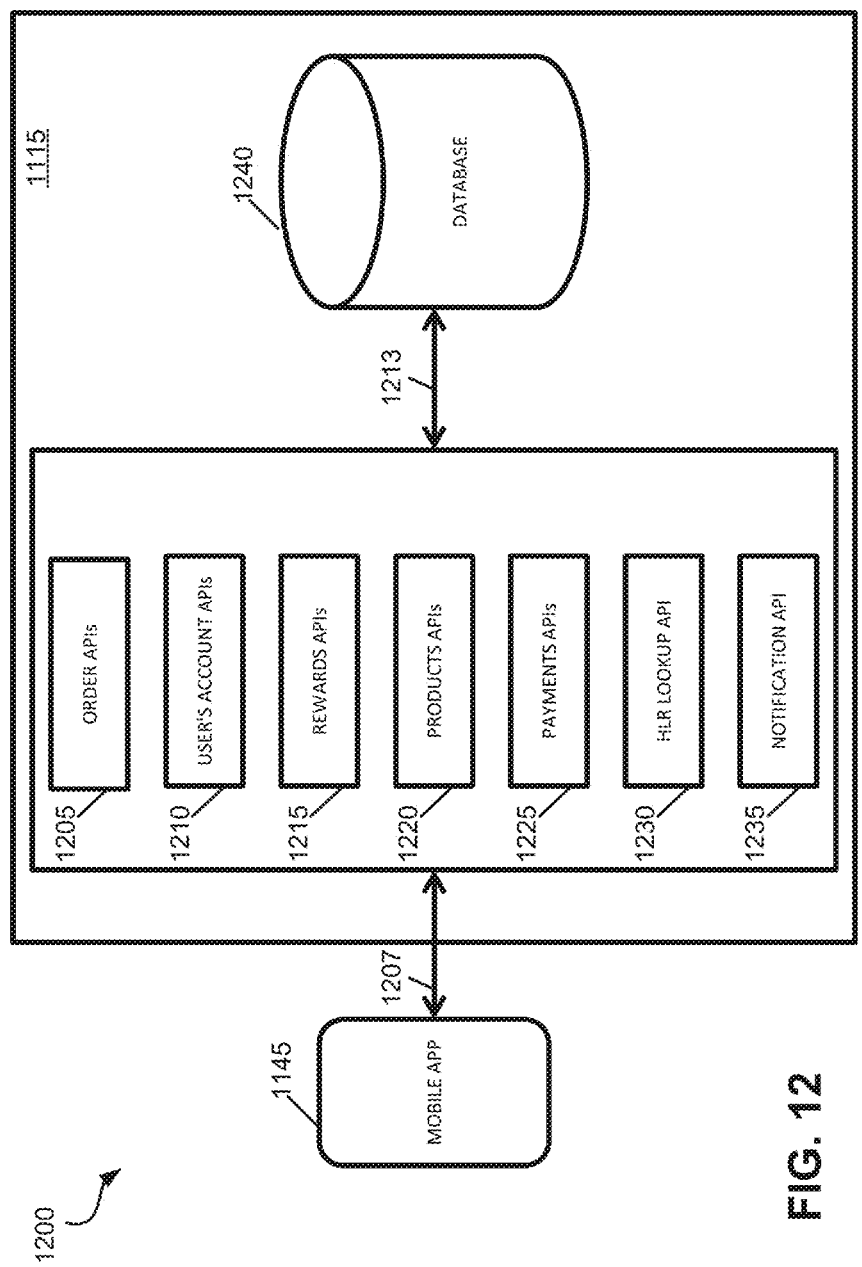
FIG. 12 is a more detailed block diagram of a TMRTR having an application program interface ("API") gateway, such as that shown in FIG. 11.

FIG. 12 is a more detailed block diagram 1200 of a TMRTR 1100, having an API gateway 1115, such as that shown in FIG. 11. Beginning with block 1205, the mobile application 1145 receives a request from a portable device (not shown) for processing a top-up, recharge, addition, and/or transfer of telephone minutes or money to a phone user's account for using a telephone service, and track and apply reward points. For example, a phone user can top-up, recharge, addition, and/or transfer of telephone minutes or money to a phone user's account during a chat session via the mobile application 1145.

At line 1207, the mobile application 1145 initiates communication with the API gateway 1115 to facilitate processing orders, user's account, rewards (V-coins), products (top up, eGift top up, voice calls), payments, HLR lookup and notification via respectively an order API 1205, user's account API 1210, rewards API 1215, products API 1220, payments API 1225, HLR lookup API 1230 and notification API 1235, all of which communicates with the database 1240 at line 1213 to store their respective data. The order API 1205 facilitates processing orders in connection with eGift and top up. The user's account API 1210 creates new user's account, business entities (e.g., distributors and retailers), user networks, and distributor/retailer networks, and updates existing user's accounts, business entities, user networks, and distributor/retailer networks.

The rewards API 1215 tracks, awards, and applies V-coins, for example, to a user's account and business entities (e.g., distributors and retailers). The products API 1220 facilitates processing products, such as top up, eGift top up, and voice calls, requested by the mobile application 1145 (FIG. 1). The payments API 1225 facilitates processing financial transactions in connection to the top-up and eGift, requested by the mobile application 145. The HLR look up API 1230 facilitates processing a home location register (HLR) look up service to determine the telephone service company (e.g., MobiFone™, Telcel™, etc.) of a desired telephone number and the geographical location (e.g., Vietnam, Mexico, etc.), respectively, based on the desired phone number. The notification API 1235 facilitates notifying a user via the mobile application 1145 relating to the financial transactions of the top-up and eGift. It should be notes that the HLR lookup API 1230 is similar to the HLR lookup 225 (FIG. 2).

Figure 13:
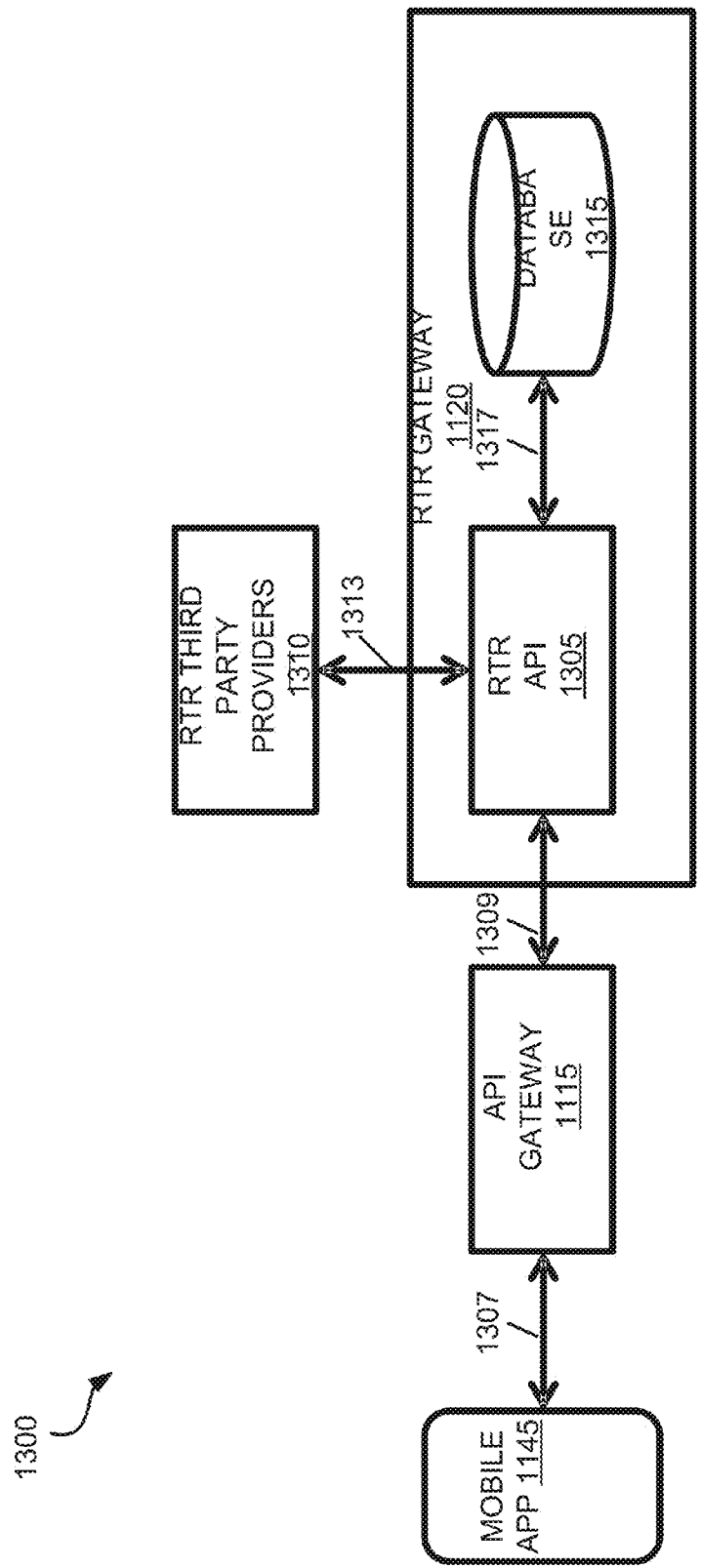
FIG. 13 is a more detailed block diagram of a TMRTR having a real-time replenishment ("RTR") gateway, such as that shown in FIG. 11.

FIG. 13 is a more detailed block diagram 1300 of a TMRTR 1100 having a real-time replenishment ("RTR") gateway 1120, such as that shown in FIG. 11. The RTR gateway 1120 includes a real-time replenishment ("RTR") API 1305 enables a user via a mobile application 1145 to send e-gifts to a user, and/or top-up, recharge, addition, and/or transfer of telephone minutes or money to a phone user's account during a chat session by way of a messaging server 1135, such as that shown in FIG. 11.

Beginning with line 1307, the mobile application 1145 communicates with the API gateway 1115 that enables the processing of top up and e-gifts via products API 1220 (FIG. 12). The RTR API 1305 receives instructions from the products API 1220 to process the requested top up and eGift, and communicates with real-time replenishment ("RTR") third party providers 1310 (such as, eGift providers and mobile phone service providers) to verify and validate information related to the requested top up and eGift, and a desired phone user's account, via lines 1309 and 1313.

The RTR API 1305 can communicate with eGift providers and mobile phone service providers through their APIs. The mobile phone service providers can include, but not limited to, MobiFone™, Telcel™, USACELL™, Nextel™, Unefon™, etc. Responsive to the mobile phone service providers verifying that a phone user's account having a valid number of phone minutes and/or amount of money, the mobile phone service providers top up, recharge, add, and/or transfer the phone minutes and/or money to a phone user's account associated with a desired phone number at a database 1315.

e-Gift providers can include, but not limited to, Amazon, Adidas, Aeropolstale, AMC Theaters, Baby Gap, Banana Republic, Responsive to the eGift providers verifying that an eGift is valid and/or amount of money, the eGift providers send the eGift to the desired phone user's account via the RTR API 1305 and the database 1315.

Figure 14:
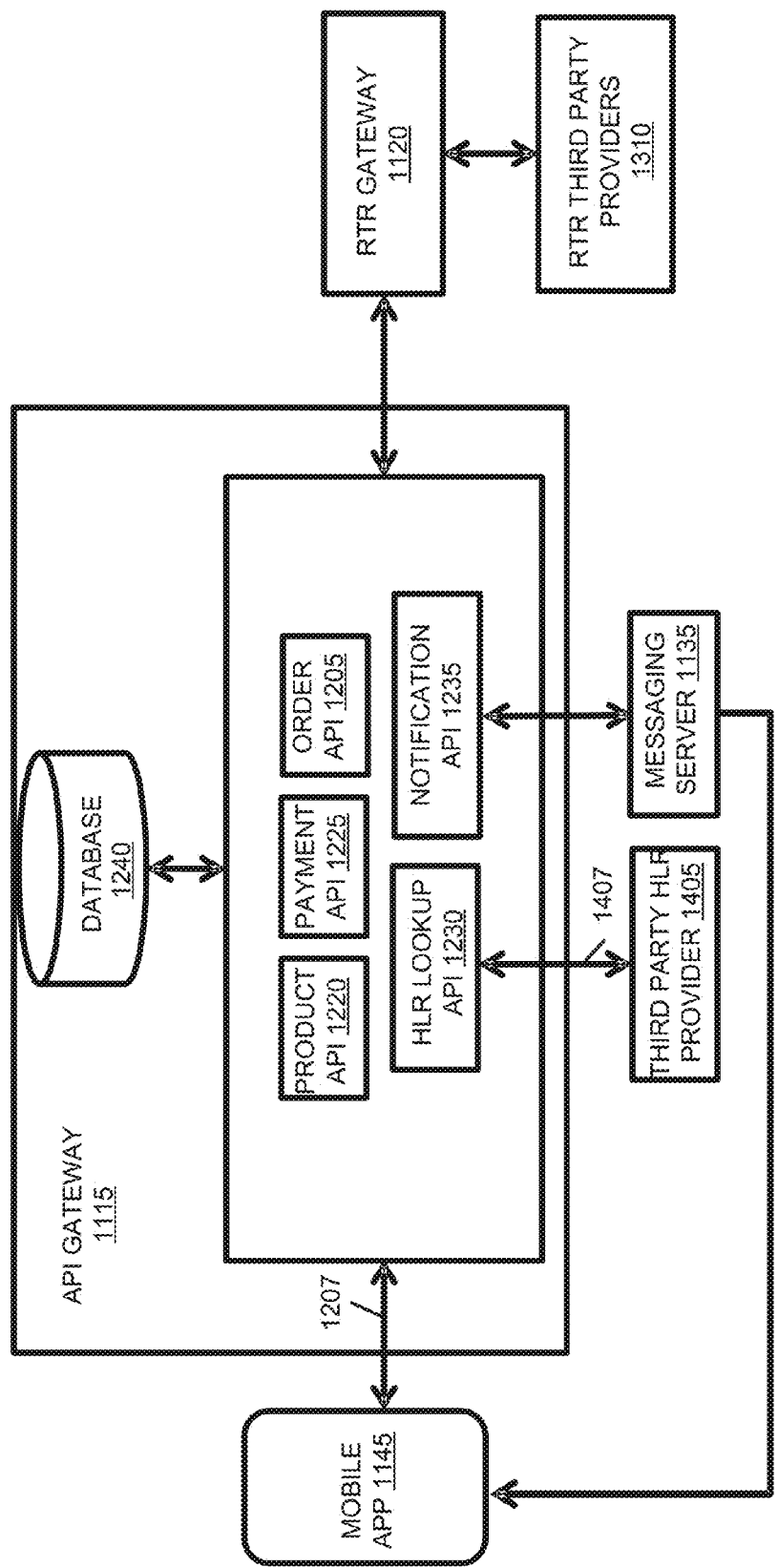
FIG. 14 is a more detailed block diagram of a TMRTR for processing a top-up, and/or e-gifts and/or a money transfer using a chat feature of a mobile application in accordance with an embodiment of the disclosure.
Figure 17:
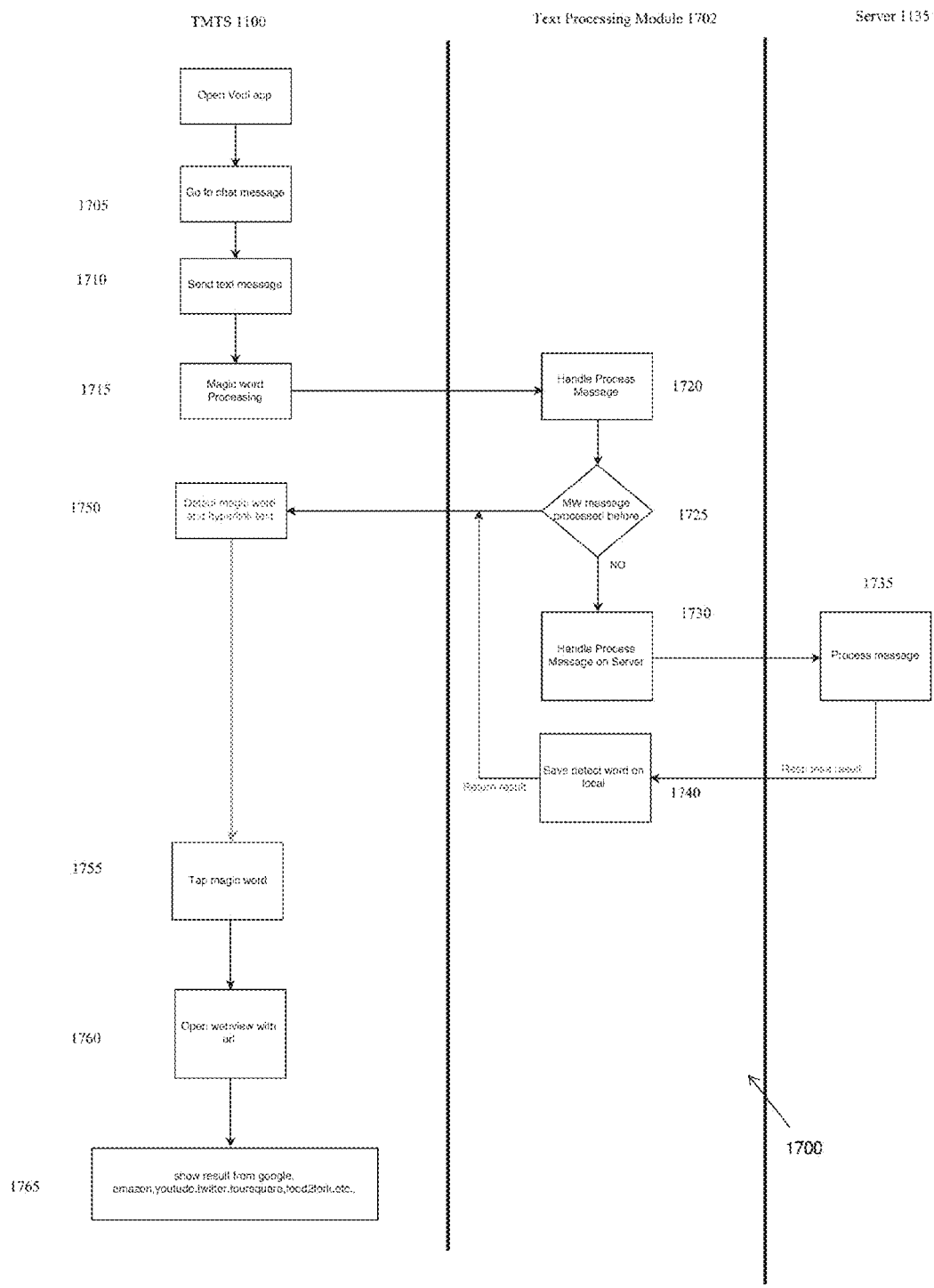
FIG. 17 is a sequence diagram for processing conversational commerce via a chat feature of a mobile application in accordance with an embodiment of the disclosure.

FIG. 14 is a more detailed block diagram of a TMRTR 1100 for processing a top-up and/or a money transfer using a chat feature of a mobile application 1145 in accordance with an embodiment of the disclosure. Similarly in FIG. 2 at line 1207, the mobile application 1145 initiates communication with the API gateway 1115 to facilitate processing products (such as, top up, e-gifts, etc.). The user can initiate processing the products in a chat feature of the mobile application 1145, which is shown in FIG. 17.

Regarding processing top ups, the API gateway 1115 can use HLR lookup API 1230 to communicate with a third party HLR provide 1405 via line 1407 using, for example, the Internet, to determine a telephone service company (e.g., MobiFone™, Telcel™, etc.) of a desired telephone number and the geographical location (e.g., Vietnam, Mexico, etc), respectively, based on the desired phone number. Responsive to the determining the telephone service company and the geographical location, the API gateway 1115 can use the product API 1220 to list and obtain details related to topping up a desired phone user's account. The details of the top up can include listing the amount of money and reward coins.

Responsive to receiving the details of the top up, the API gateway 1115 can use the payment API 1225 to list payment methods and obtain payment information from the user. The API gateway 1115 can use the order API 1205 to obtain the payment information and verify the financial transaction based on the obtained payment information. Responsive to verifying that the financial transaction in connection to the eGift is successful, the order API 1205 communicates with the RTR third party providers 1310 via the RTR gateway 1120 to top up the desired phone user's account. Responsive to topping up the desired phone user's account, the API gateway 1115 can use the notification API 1235 to notify the user using a chat feature on the mobile application 1145 via a messaging server 1135 that the desired user's account is topped up. A sequence diagram in FIG. 15 describes in more detail the sequence of events for processing a top up to a phone user's account.

Regarding processing e-gifts, the API gateway 1115 can use the product API 1220 to list and obtain details related to the e-gifts. The details of the e-gifts can include listing the amount of money, eGift providers, and reward coins. Responsive to receiving the details related to the e-gifts, the API gateway 1115 can use the payment API 1225 to list payment methods and obtain payment information from the user. The API gateway 1115 can use the order API 1205 to obtain the payment information and verify the financial transaction based on the obtained payment information. Responsive to verifying that the financial transaction in connection to the eGift is successful, the order API 1205 communicates with the RTR third party providers 1310 via the RTR gateway 1120 to send the eGift to the desired phone user's account. The API gateway 1115 can use the e notification API 1235 to notify the user through a chat feature on the mobile application 1145 via the messaging server 1135 that the desired user's account has received the eGift. A sequence diagram in FIG. 16 describes in more detail the sequence of events for processing an eGift to a phone user's account.

Figure 15:
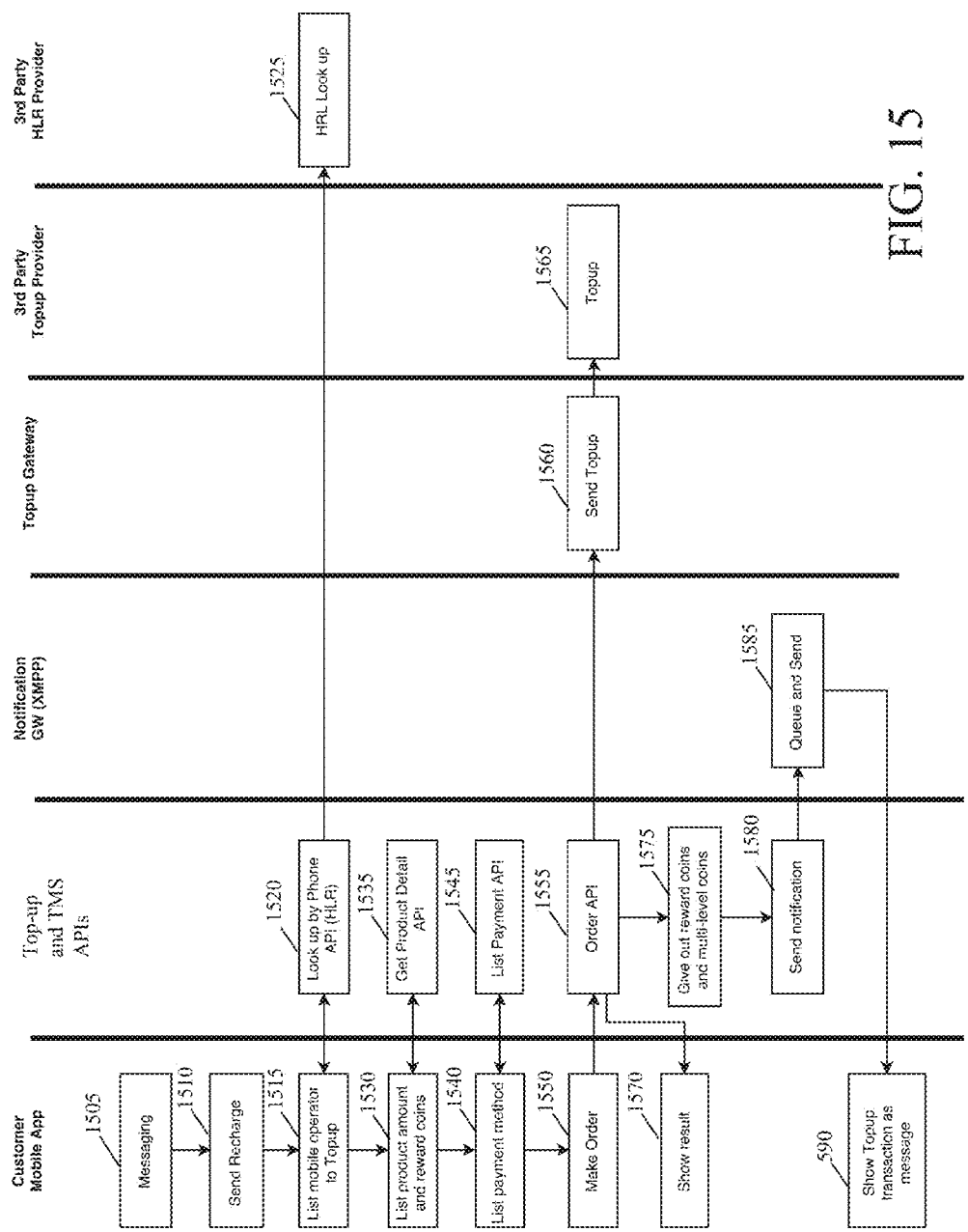
FIG. 15 is a sequence diagram for processing a top-up and/or a money transfer in a TMRTR system using a chat feature of a mobile application in accordance with an embodiment of the disclosure.

FIG. 15 is a sequence diagram for processing a top-up and/or a money transfer in a TMRTR system 100 using a chat feature of a mobile application 1145 in accordance with an embodiment of the disclosure. Beginning with block 1505, a chat session is established among users via the chat feature of the mobile application 1145. From the chat session, a user can initiate a recharge of a phone user's account at block 1510 and a list of mobile operator appears on the screen at block 1515. At blocks 1520 and 1525, a home location register (HLR) look up service 225 to determine the telephone service company (e.g., MobiFone™, Telcel™, etc.) of the inputted telephone number and the geographical location (e.g., Vietnam, Mexico, etc.), respectively, based on the inputted phone number.

At block 530, a list of product amount and reward coins appears on the screen from the mobile application 1145. Upon selecting an item on the list of the product amount and reward coins, the mobile application 1145 can gather information related to the select item via a get product detail API 1220 at block 1535. At blocks 1540 and 1445, a list of payment methods is presented on the screen through the mobile application 1145 via a list payment API 1225. At blocks 1550 and 1555, a user inputs financial information to make an order in which the Order API 1205 processes. Upon approval/validation of the financial transaction, the phone user's account is topped up by a RTR third party provider 1310 via the RTR gateway 1120 at blocks 1560 and 1565, respectively. At blocks 1570 and 1575, the Order API 1205 shows the result of the financial transaction on the chat feature of the mobile application 1145 and possibly gives out reward coins and multi-level coins. At blocks 1580 and 1585, a notification of the reward coins and multi-level coins can be sent via the notification API 1235 and the notification GW (XMPP). At block 1590, the top-up transaction is shown as a message on the chat feature of the mobile application 1145.

Figure 16:
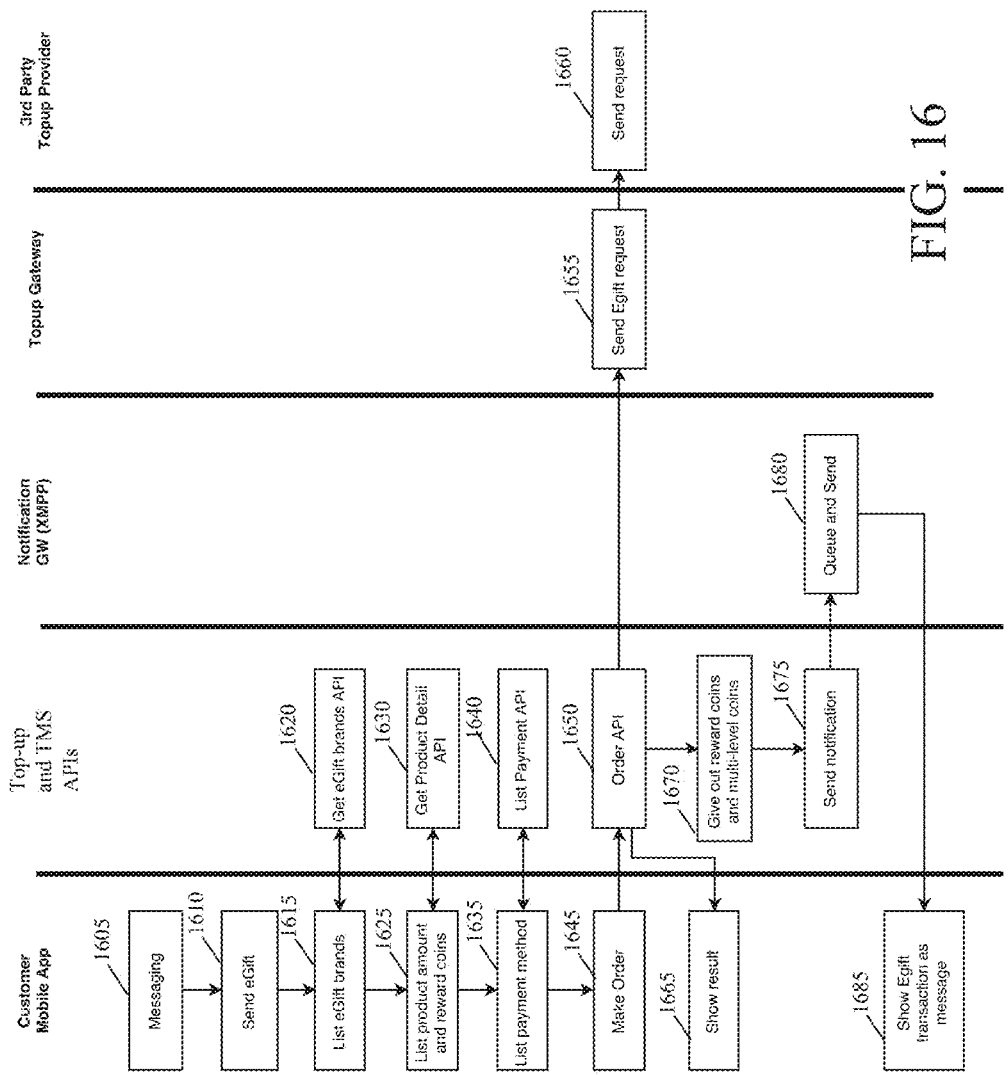
FIG. 16 is a sequence diagram for processing e-gifts in a TMRTR system using a chat feature of a mobile application in accordance with an embodiment of the disclosure.

FIG. 16 is a sequence diagram for processing e-gifts in a TMRTR system 1100 using a chat feature of a mobile application 1145 in accordance with an embodiment of the disclosure. Beginning with block 1605, a chat session is established among users via the chat feature of the mobile application 1145. From the chat session, a user can initiate sending an eGift to a recipient at block 1610. At block 1615 and 1620, a list of eGift brands appears on the screen at block 1615 via an eGift brands API 1220.

At block 1625, a list of product amount and reward coins appears on the screen from the mobile application 1145. Upon selecting an item on the list of the product amount and reward coins, the mobile application 1145 can gather information related to the selected item via a get product detail API 1220 at block 1630. At blocks 1635 and 1640, a list of payment methods is presented on the screen of the mobile application 1145 via a list payment API 1225. At blocks 1645 and 1650, a user inputs financial information to make an order in which the Order API 1205 processes. Upon approval/validation of the financial transaction, the mobile application 1145 sends an eGift request by a RTR third party provider 310 via the RTR gateway 1120 at blocks 1655 and 1660, respectively. At blocks 1665 and 1670, the Order API 1205 shows the result of the financial transaction on the chat feature of the mobile application 1145 and possibly gives out reward coins and multi-level coins. At blocks 1575 and 1580, a notification of the reward coins and multi-level coins can be sent via a notification API 1235 and the notification GW (XMPP). At block 1690, an eGift transaction is shown as a message on a chat feature of the mobile application 1145.

FIG. 17 is a sequence diagram 1700 for processing chat session messages that contain hyperlinks to detected keywords by a telecommunication messaging and real-time replenishment system (TMRTR) 1100. From the chat session, the TMRTR 1100 can assist a user to make a reservation, buy tickets for an event, find a nearby restaurant or a restaurant offering a specific type of food, and send an eGift to a recipient. In this example, a user would dictate or compose a message using a mobile chat feature of a mobile app 1145 (FIG. 1), as shown in step 1705. Then the user sends the message by way of the mobile chat feature, as shown in steps 1710. The TMRTR 1110 also initiate a magic word processing at step 1715 that includes algorithms that enables the mobile chat feature to identify certain words that would indicate that the user would do certain activities, such as, make a reservation, buy tickets for an event, find a nearby restaurant or a restaurant offering a specific type of food, and send an eGift to a recipient. These algorithms can be accomplished at a Text Processing Module 1702 and a messaging server 1135.

The text message is sent to and handled by the Text Processing Module 1702 at step 1720. If the text message has been processed before by the magic word processing as indicated at step 1725, then the message is displayed in the mobile application 1145 with identified words in contrasting colored text or bolded text, such as that shown at step 1750. A user can tap on the contrasting colored hyperlinked text or bolded hyperlinked text, such as that shown at step 1755, which opens an Internet webpage associated with the hyperlink (step 1760) showing results from an Internet search of the related term conducted by a search engine such as Google, Amazon, YouTube, Twitter, Four Square, or Food2Fork, such as that shown at step 1765.

Returning to step 1730, if the text message has not been processed before, then the text message is placed in queued for processing at the messaging server 1135. At step 1735, the text message is processed at the messaging server 1135 by detecting words in the message that are associated with goods and services that could result in the user making a financial transaction, such as making a reservation, buying tickets for an event, finding a nearby restaurant or a restaurant offering a specific type of food, buying a product online from a vender like Amazon, and sending an eGift to a recipient at block. The messaging server 1135 returns the results to the Text Messaging Module 1702 where the detected words are saved locally on a storage device of a mobile device, which has the mobile application 1145. The processed message goes to steps 1750, 1755, 1760, and 1765 as mentioned above.

Figure 18:
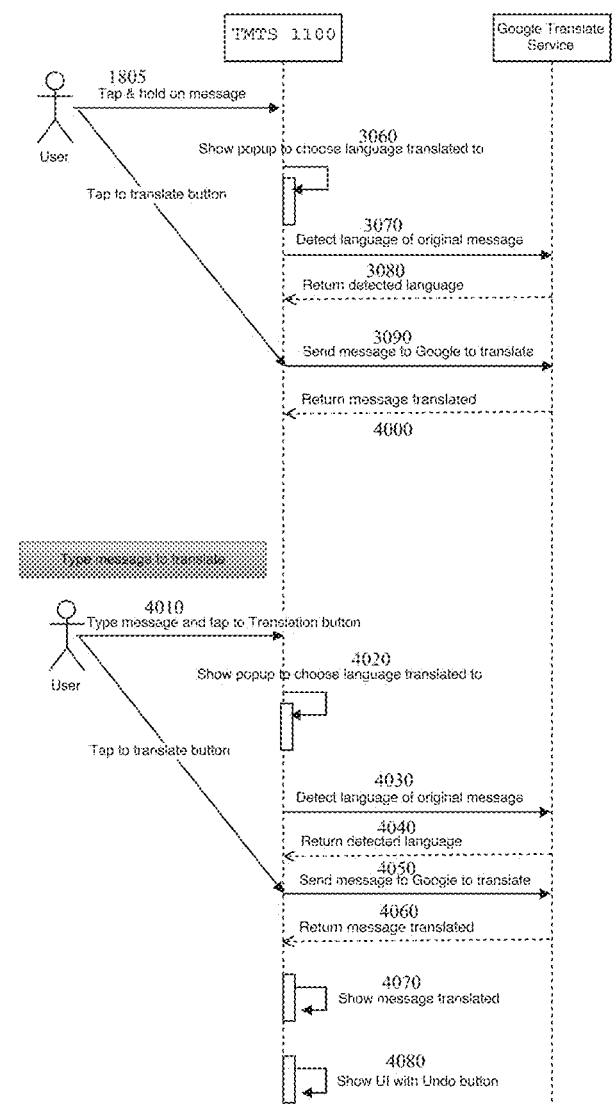
FIG. 18 is a sequence diagram for processing a language translation within a chat feature of a mobile application in accordance with an embodiment of the disclosure.

FIG. 18 is a sequence diagram 1800 for translating the language in a chat session message in a TMRTR system 1100 from a one language to another within the chat session for chat messages the user either creates or receives. From the chat session, a user can translate the chat language. For example, a user taps and holds to select the message to be translated, such as that shown at step 1805. Once selected, a popup window appears within the chat session allowing the user to select the base language the original message and the language the user wants the message translated into, such as that shown in 1810. Once these parameters are set in the pop-up window, at step 1815, the application running the chat session can send the message through an interface to Google Translate Service or a similar translation service to detect the language of the original message. Google Translation Service or a similar translation service then returns the detected language of the original message to the chat session, such as that shown at step 1820. The chat application then sends the chat message to be translated, along with the translation parameters, to Google Translation Services or a similar translation service to be translated, such as that shown at step 1825. Google Translation Service or a similar translating service then returns the translated message to the chat message application, at step 1830, for all participants in the chat to read thereby facilitating multilingual conversational chat and/or text messaging within the application.

Steps 1835, 1840, 1845, 1850, 1855, and 1860 is similar to steps 1805, 1810, 1815, 1820, 1825, and 1830, which are described above. An optional feature within the chat message is to offer as part of the user interface an undo button that allows the user to undo any translations that have occurred, thereby displaying the users own base language, such as that shown at step 1870.

Figure 19:
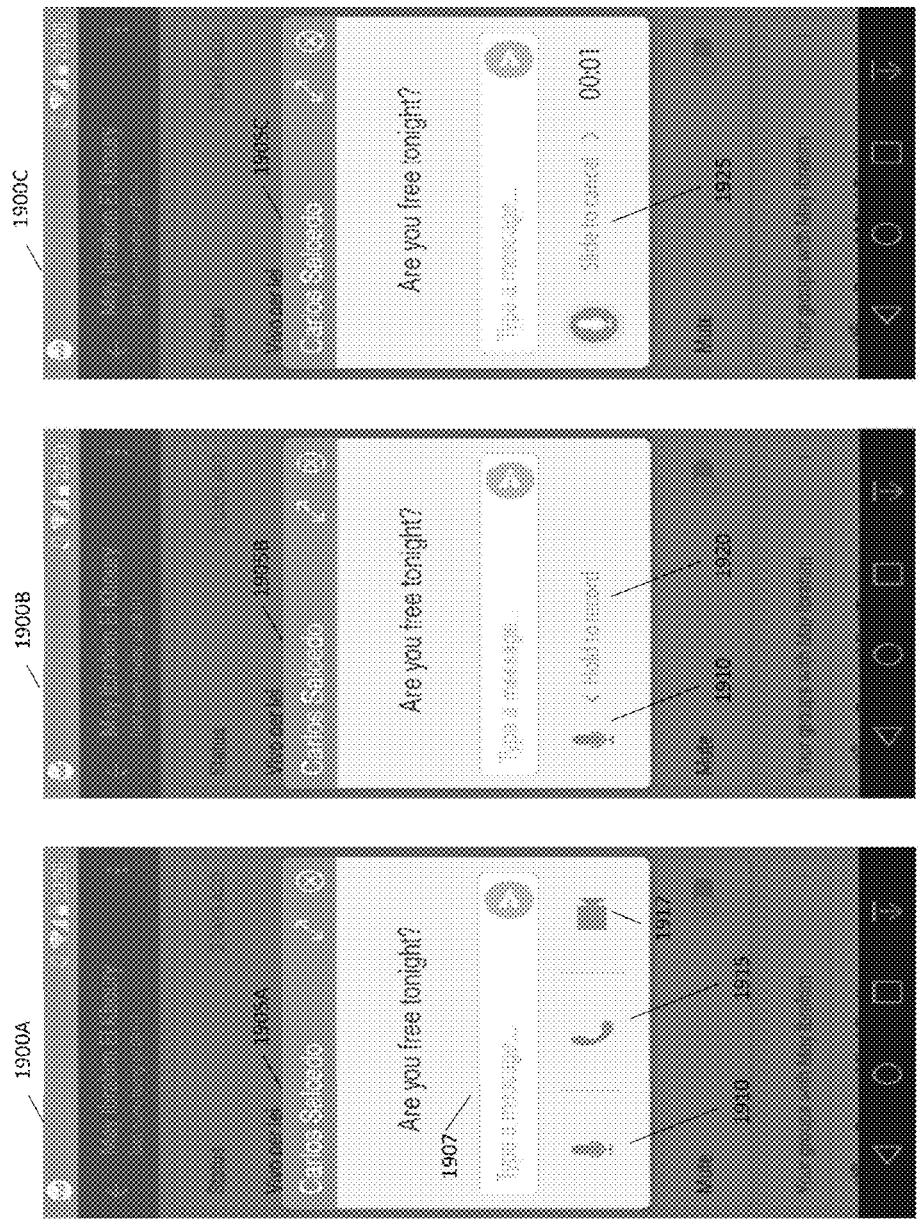
FIG. 19 is a diagram of the graphical user interface showing a users' option to respond to a message by typing, recording, calling or video.

FIG. 19 shows another aspect of the chat feature allowing direct access to the chat feature from anywhere in the TMRTR application including a devices home or locked screen 1900 such that the chat application does not need to be opened. When a chat message is received, a pop-up notification 1905 occurs alerting the user to the newly received message. The graphical user interface of the pop-up notice 1905 allows the user to reply by text 1907, voice recording 1910, voice calling 1915, or video calling 1917 directly from the pop-up notification on the devices home or locked screen. For voice recording, the chat feature provides instructions on how to record, such as "Hold to record" 1920, and how to cancel the recording, such as "Slide to cancel" 1925.

Figure 20:
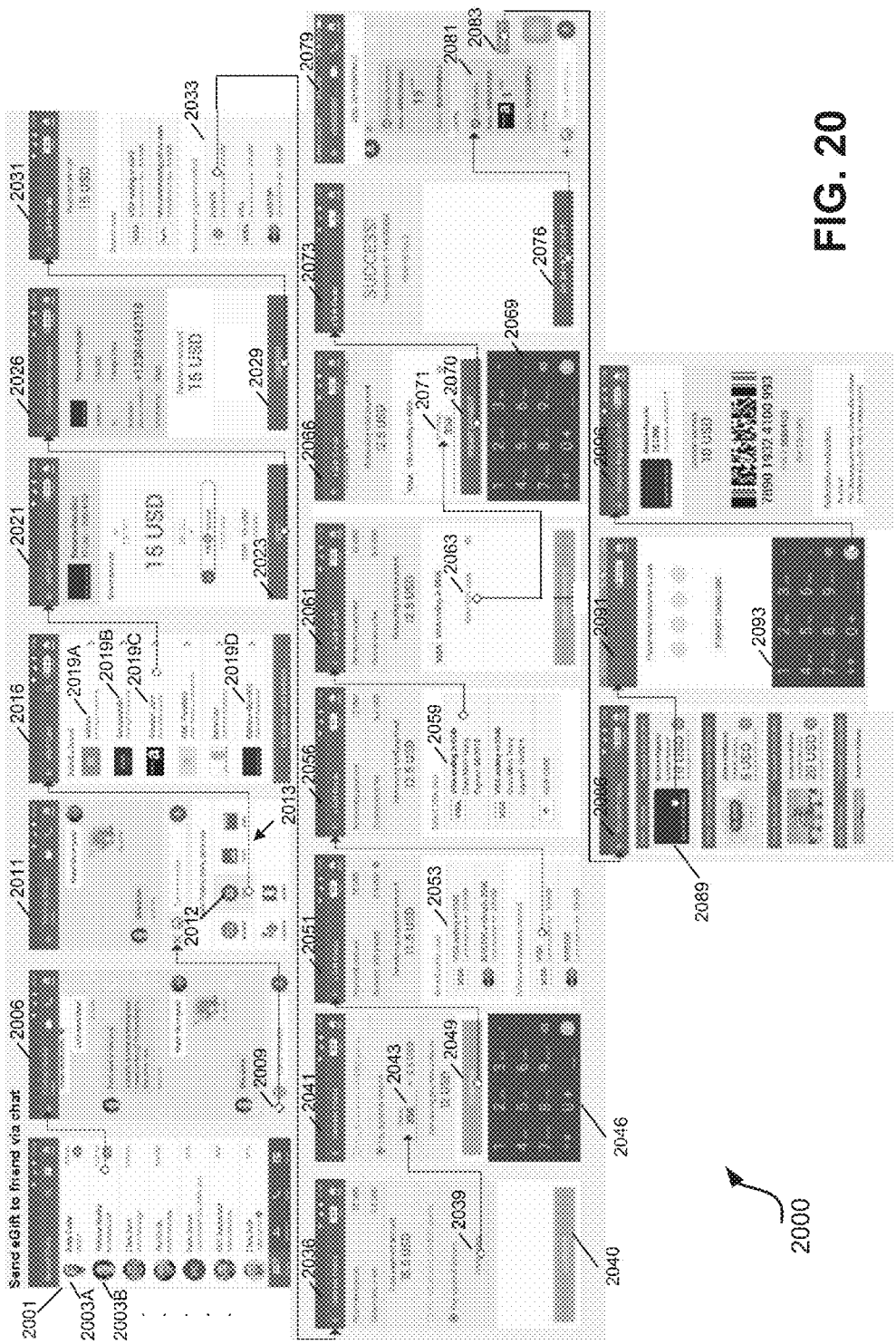
FIG. 20 is sequence of screen shots for sending eGfits via chat of a mobile application in accordance with an embodiment of the disclosure.

FIG. 20 is a sequence of screen shots for sending eGifts via chat of a mobile application 1145 in accordance with an embodiment of the disclosure. Beginning with screen shot 2001, it shows a list of recent chats 2003A, 2003B, and others on a chat mobile application of a mobile user. In this example, the mobile user can select chat user 2003B to begin sending an eGift to the chat user 2003B, such as that shown on screen shot 2006. The mobile user can select a "+" symbol 2009 to expand a list of features 2013 that includes the feature of sending an eGift 2012, such as that shown on screen shot 2011.

Responsive to the mobile user selecting an eGift indicia 2012, the chat application displays an eGift card screen shot 2016, which includes a list of brands, such as Adidas 2019A, Aeropostale 2019B, Amazon 2019C, Banana Republic 2019D and so on. Responsive to selecting Banana Republic 2019D, the chat application displays screen shot 2021, which provides an option of selecting an amount of money (e.g., 10 USD and 5 v-coins, totaling 15 USD) to charge on an eGift card. Responsive to selecting the next button 2023, a confirmation information screen shot 2026 appears displaying the payment amount to a recipient at a phone number with a delivery method of SMS. Responsive to selecting the confirm button 2029, a payment method screen shot 2031 appears displaying the payment amount and various methods of payments, such as visa credit card, PayPal, v-coin points 2033, and MasterCard, among others.

Responsive to selecting the payment method of v-coin points 2033, redeem points screen shot 2036 appears displaying payment amount, convenience fee, total payment amount, and options of paying the full amount or partial amount with v-coin points. In this example, partial payment using v-coin points is selected and responsive to selecting the confirm button 2040, the redeem points screen shot 2041 appears displaying options to input the amount of v-coin points 2043 (e.g., 350 points) using an on-screen number pad 2046. The inputted v-coin points are converted to dollar amounts and subtracted from the total payment amount, resulting in the remaining payment amount (e.g., 12 USD).

Responsive to selecting the confirm button 2049, the eGift cards screen shot 2051 appears displaying the payment amount, redeem v-coin points (e.g., 350 points which are valued to be $3.5 USD), the remaining payment amount (e.g., $11.5 USD), a list of recent used payment methods, such as Visa credit card 2053, MasterCard, and list of new payment methods. Responsive to selecting Visa credit card 2053, the eGift card screen shot 2056 appears displaying the remaining payment (e.g., 12 USD), convenience fee (e.g., $0.5 USD), and a list of stored Visa credit cards. Responsive to selecting a stored Visa credit card 2059, the eGift Card screen shot 2061 appears displaying the remaining payment (e.g., $12 USD), convenience fee (e.g., $0.5 USD), the remaining total payment (e.g., $12.5 USD), the Visa Credit card 2059, a number pad 2069, and a CVV code input bar 2071 (e.g., inputted the number 350).

Responsive to selecting submit payment button 2070, the eGift Card screen shot 2073 appears displaying a success message with a transaction ID number. Responsive to selecting a "Go Back to Chat" button 2076, a chat screen shot 2079 appears displaying a eGift card receipt 2081 in the chat session between the mobile user and the chat user 2003B.

The eGift card receipt 2081 also includes an "open now" button 2083 and responsive to the chat user 2003B selecting the button 2083, the My eGift cards screen shot 2086 appears on the chat user's mobile application displaying a list of received eGifts that includes the eGift 2089 (e.g., a credit amount of $10 USD for any items purchased at Banana Republic). Responsive to selecting the eGift 2089, the passcode screen shot 2091 appears displaying a number pad 2093 that can be used to input a four number code. Responsive to inputting a valid passcode, a redemption screen shot 2096 appears displaying a credit amount of $10 USD that can be used at a participating retailer (e.g., Banana Republic) along with a redemption bar code, redemption number, pin number and redemption instructions. The chat user 2003B can use the redemption information at the participating retailer to redeem the received $10 USD from the mobile user.

Figure 21:
FIG. 21 is sequence of screen shots for recharging another user's mobile account via chat of a mobile application in accordance with an embodiment of the disclosure.

FIG. 21 is a sequence of screen shots for recharging, another user's mobile account via chat of a mobile application 1145 in accordance with an embodiment of the disclosure. Beginning with screen shot 2101 it shows chat exchanges and a list of features that includes a recharge indicia 2103. Responsive to selecting the recharge indicia 2103, the mobile user 2102 can initiate the process of recharge a mobile account of a chat user 2104 at the chat session of the mobile application. In this example, the recharge friend mobile screen shot 2106 appears displaying the mobile number of the chat user 2104 and a list of mobile operators, such as operator 2109. It should be noted that the list of mobile operators can be determined using the HLR look up service 225 (FIG. 2), as described and shown previously, such that the recharge friend mobile screen shot 2106 is bypassed and instead the recharge friend mobile screen shot 2111 appears responsive to selecting the recharge indicia 2103 at screen shot 2101.

At the recharge friend mobile screen shot 2111, the mobile number and mobile operator are displayed along with a selection of recharge amounts 2113. In this example, responsive to selecting 50 MXN, the recharge friend mobile screen shot 2116 appears further displaying an option of recharging with v-coin points (e.g., 5 v-coin points). Responsive to selecting the next button 2119, the confirmation information screen shot 2121 appears displaying the chat user, mobile number, mobile operator, the recharge amount (e.g., 50 MXN), and the payment amount (e.g., 5 USD). Responsive to selecting the next button 2123, the recharge friend mobile screen shot 2126 appears displaying a list of payment methods (e.g., recently used and new payment methods). Responsive to selecting a payment method 2129, the recharge friend mobile screen shot 2126 appears displaying the payment amount (e.g., 5 USD), convenience fee (0.5 USD), the total payment amount (e.g., 5.5 USD), and the payment method 2133.

Responsive to selecting a payment method 2133, the recharge friend mobile screen shot 2126 appears further displaying a CVV code input bar 2139. Responsive to selecting the input bar 2139, the recharge friend mobile screen shot 2126 appears further displaying a number pad 2146 for inputting number onto the CVV code input bar 2139. Responsive to selecting the submit payment button 2143, the recharge friend mobile screen shot 2126 appears displaying a success message. Responsive to selecting a "Go Back to Chat" button 2151, a chat screen shot 2153 appears displaying a mobile recharge receipt 2156 in the chat session between the mobile user 2102 and the chat user 2104. The mobile recharge receipt 2156 represents that credits were put into the mobile account of the chat user 2104.

Figure 22:
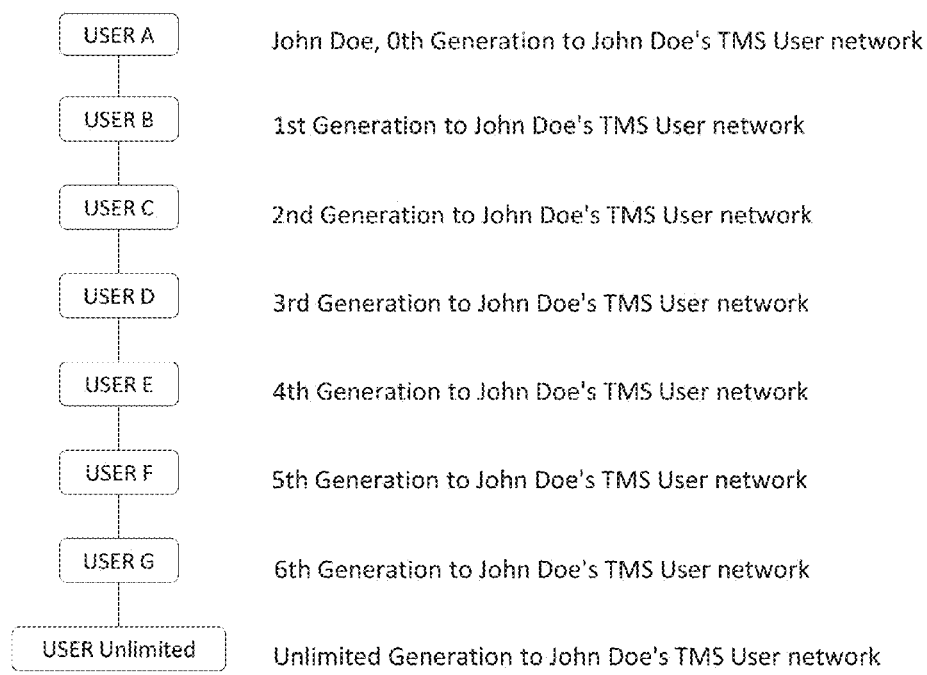
FIG. 22 is a TMRTR distributor/retailer network having overriding level in accordance with an embodiment of the invention.

FIG. 22 is a TMRTR user network 2200 in accordance with an embodiment of the invention. As mentioned above, a user can accumulate reward points (such as, V-coins) when other users in your social network make purchases by way of, for example, a referral program of the TMRTR 1100. Referring now to FIG. 22, to the participate in the referral program, the mobile application 1145 issues a referral code to User A, which is a unique code that is associated with the user's mobile application account. The mobile application 1145 assign the user a first level status when the user installs, sign-up and uses the mobile application 1145.

The user can invite others (e.g., User B) to install and use the mobile application 1145 using the referral code. The more others install and use the mobile application 1145 using the referral code, the more reward points the user earns. A first generation network is a network of people who join with the user's referral code. The user can receive reward points responsive to the user's first generation network making purchases.

Responsive to the first generation network reaching a determined number of people, the mobile application 1145 assign User A a second level status, which enables User A to earn reward points through additional generation networks, such as first generation (e.g., User B), second generation (e.g., User C), and so on (e.g., Users D, E, F, G). It is appreciated by those skilled in the art that there can be multiple users at each generation. The additional generation networks are networks of people who join User A's network through the user's generation network rather than with the user's referral code. The user can receive reward points responsive to the user's additional generation network making purchases.

Figure 23:
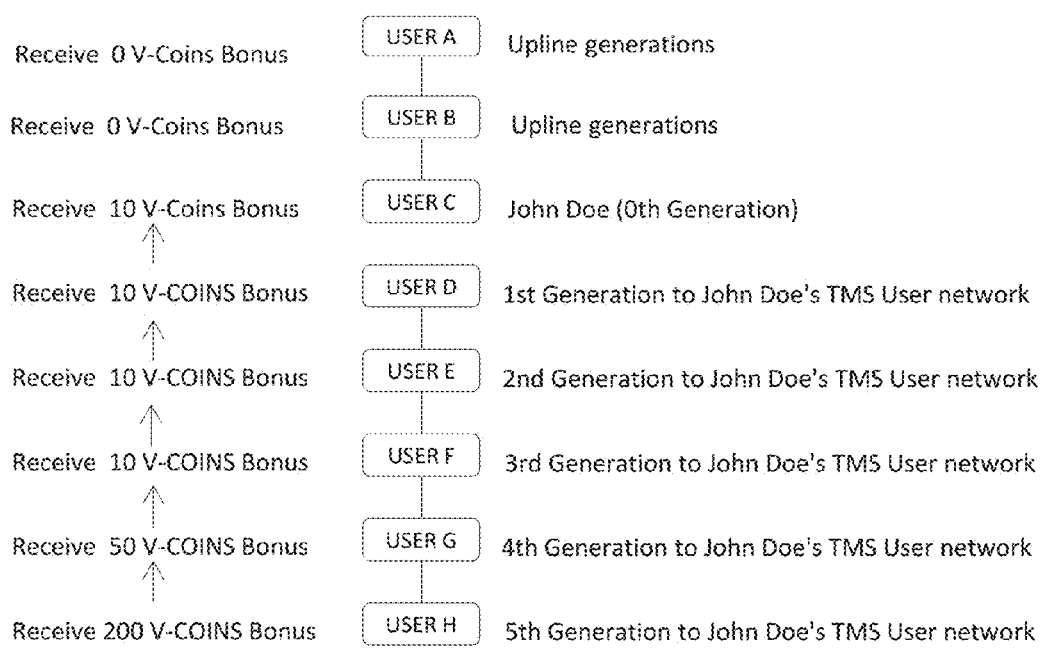
FIG. 23 is a TMRTR distributor/retailer network having overriding level in accordance with embodiment of the invention.

FIG. 23 is a TMRTR business entity network 2300 in accordance with an embodiment of the invention. Users A and B are up-line generations that include business entities. User C is in User B's network and User C can earn reward points through additional generation networks, such as first generation (e.g., User D), second generation (e.g., User E), third generation (e.g., User F), and so on (e.g., Users G AND H). It is appreciated by those skilled in the art that there can be multiple users at each generation. In this business entity network example, TMRTR 1100 does not issue reward points (e.g., V-coin bonus) to Users A or B. User C can receive reward points from Users D, E, F, G, and H; User D can receive reward points from Users E, F, G, and H; User E can receive reward points from Users F, G, and H; and so on.

Figure 24:
FIG. 24 is a TMRTR distributor/retailer network having overriding level in accordance with an embodiment of the invention.

FIG. 24 is a TMRTR distributor/retailer network 2400 in accordance with an embodiment of the invention. Distributors generally sign up directly with the TMRTR system 1100 and assigned a distributor level. Other distributor (e.g., Distributors D2 and D3) can sign up under, for example, Distributor D1's network, such as that shown in FIG. 24.

Retailer can sign up under a distributor's network or stand alone on top of the Retailer's network. The distributor's network can have unlimited number of retailers. For example, Retailers A, B, C are signed up under Distributor D1's network and Retailer D is signed up under Distributor D3's network. Retailers A, B, C, and D sign up as a business entity and a provided a referral code to invite unlimited number of users, such as Users A1, B1, C1, D1.

In FIG. 24, John Doe is Distributor D1 at level 1 and has two (2) other Distributors (e.g., D2 and D3) at levels 2 and 3, and three (3) Retailers (e.g., A, B, C). Retailer D has Retailer D in its network. Retailers A, B, C, and D have multiple users in their respective networks.

Figure 25:
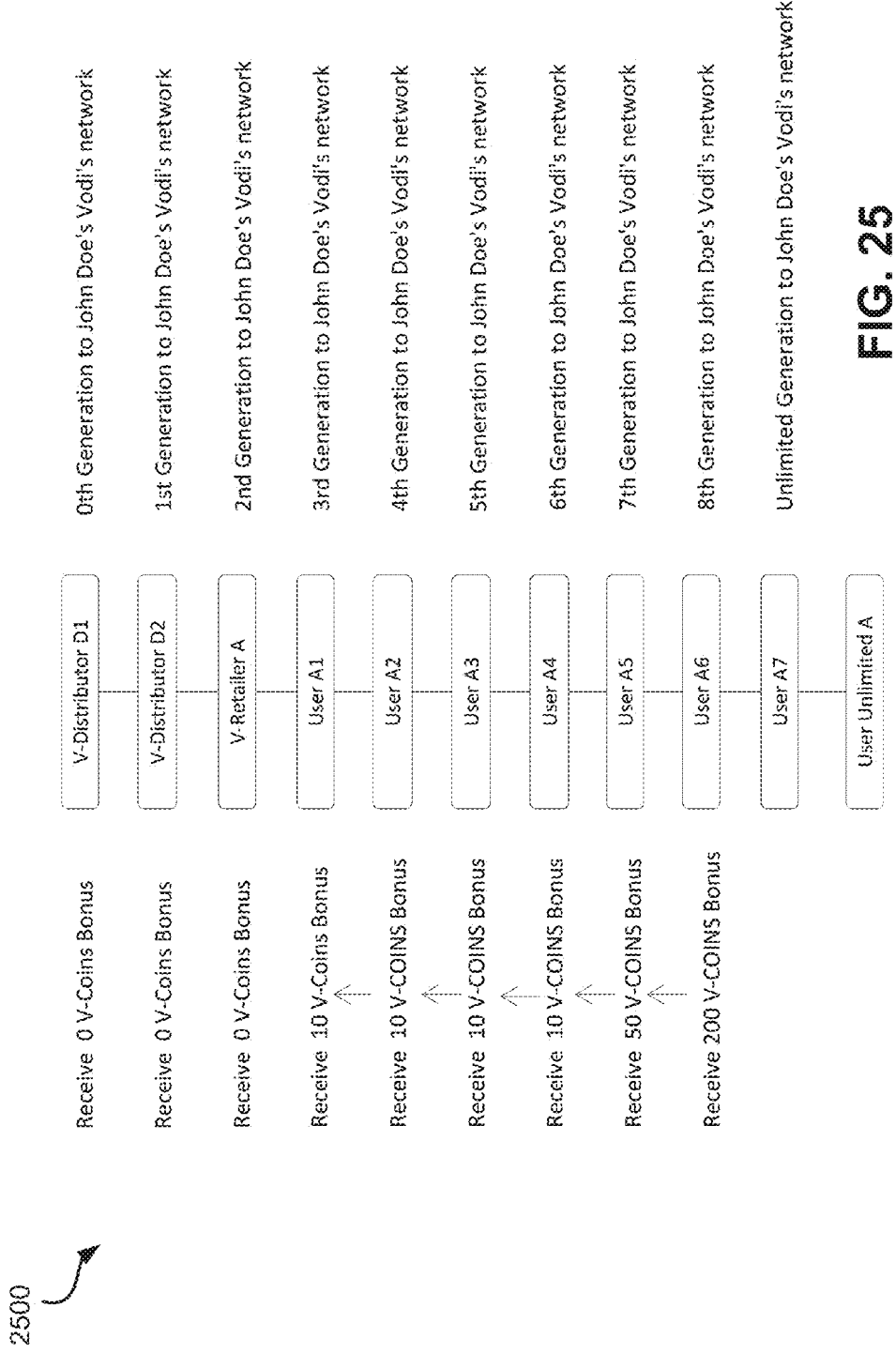
FIG. 25 is a TMRTR distributor/retailer network having overriding level in accordance with an embodiment of the invention.

FIG. 25 is a TMRTR distributor/retailer network 2500 having overriding level in accordance with an embodiment of the invention. Users and entities in an overriding level are users and entities that did not directly sign up under a TMRTR user account. In this example, Retailer A has five (5) overriding level and Distributor D2 has four (4) overriding level. Distributor D2 can receive overriding V-Coins from Users in Distributor D2's network when Users A4, A3, A2, or A1 make a purchase. Distributor D2 does not receive overriding V-Coins from any purchases from User A5, and so on. When User A6 purchases a product and receives an amount of V-Coin bonus (e.g., 200 V-coins bonus), the TMRTR system 1100 can give to Users A5, A4, A3, A2, A1 a different amount of overriding V-Coin bonus from purchases from User A6, such as, 50, 10, 10, 10, and 10 V-coins bonus, respectively.

Figure 26:
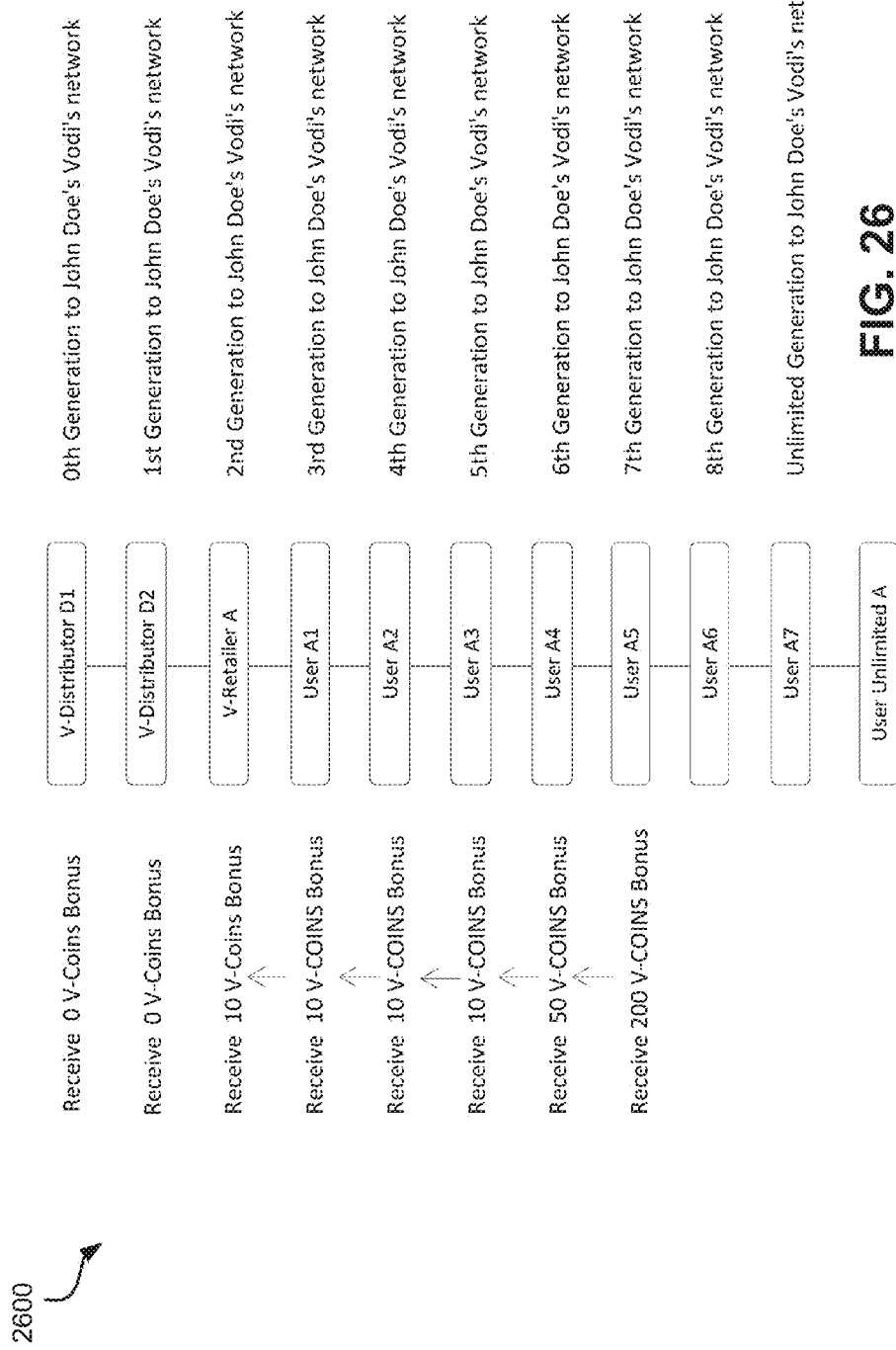
FIG. 26 is a block diagram that illustrates electrical components in a generic computing device in accordance with an embodiment of the disclosure.

FIG. 26 is a TMRTR distributor/retailer network 2600 having overriding level in accordance with an embodiment of the invention. In this example, Retailer A has five (5) overriding level. When User A5 purchases a product and receives an amount of V-Coin bonus (e.g., 200 V-coins bonus), the TMRTR system 100 can give to Users A4, A3, A2, A1 and Retailer A a different amount of overriding V-Coin bonus from purchases from User A5, such as, 50, 10, 10, 10, and 10 V-coins bonus, respectively.

Figure 27:
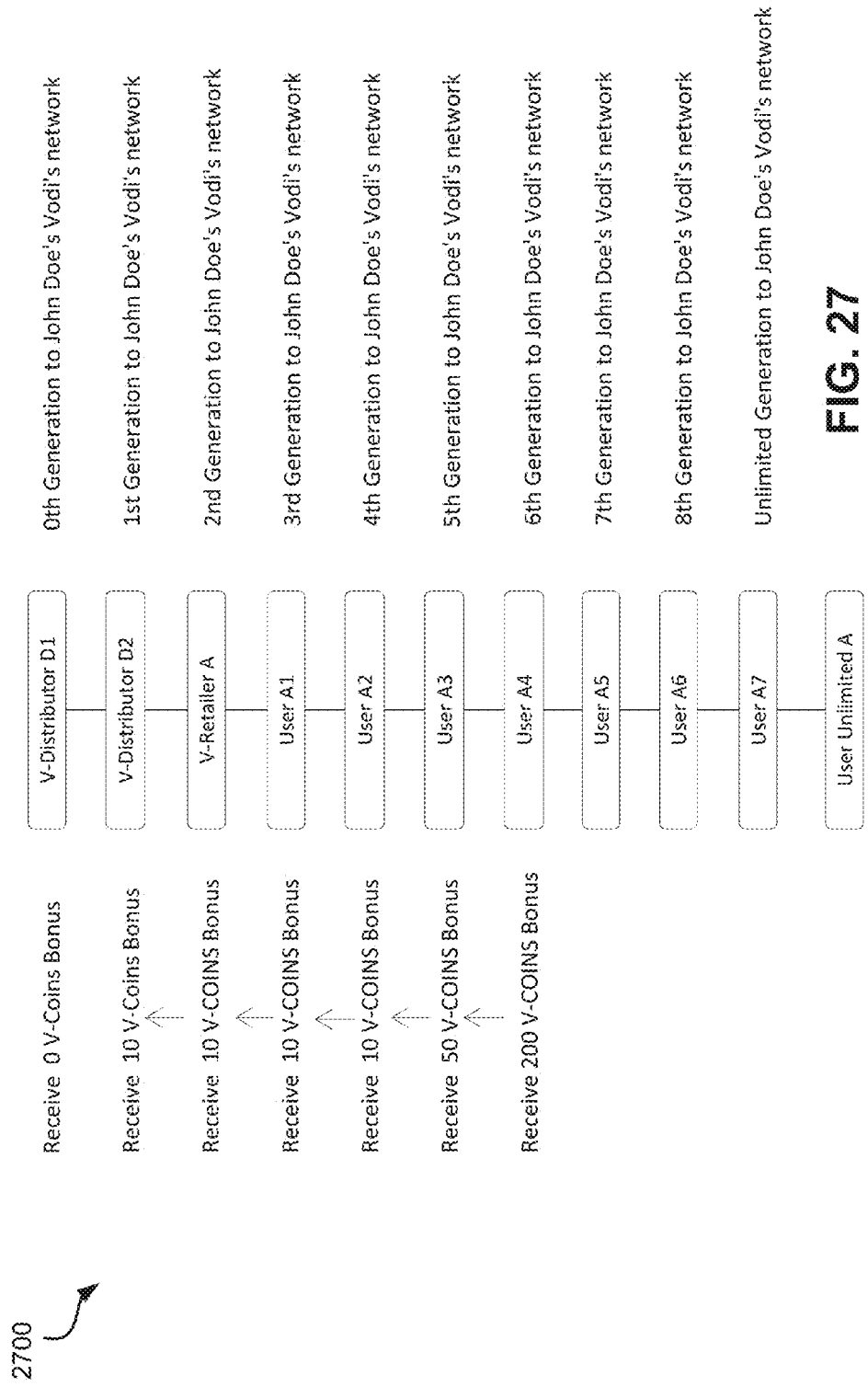
FIG. 27 is a TMRTR distributor/retailer network having overriding level in accordance with an embodiment of the invention.

FIG. 27 is a TMRTR distributor/retailer network 2700 having overriding level in accordance with an embodiment of the invention. In this example, when User A4 purchases a product and receives an amount of V-Coin bonus (e.g., 200 V-coins bonus), the TMRTR system 1100 can give to Users A3, A2, A1, Retailer A, and Distributor D2 a different amount of overriding V-Coin bonus from purchases from User A4, such as, 50, 10, 10, 10, and 10 V-coins bonus, respectively.

Figure 28:
FIG. 28 is a TMRTR distributor/retailer network having overriding level in accordance with an embodiment of the invention.

FIG. 28 is a TMRTR distributor/retailer network 2800 having overriding level in accordance with an embodiment of the invention. In this example, when User A3 purchases a product and receives an amount of V-Coin bonus (e.g., 200 V-coins bonus), the TMRTR system 1100 can give to Users A2, A1, Retailer A, and Distributors D2 and D1 a different amount of overriding V-Coin bonus from purchases from User A3, such as, 50, 10, 10, 10, and 10 V-coins bonus, respectively.

Figure 29:
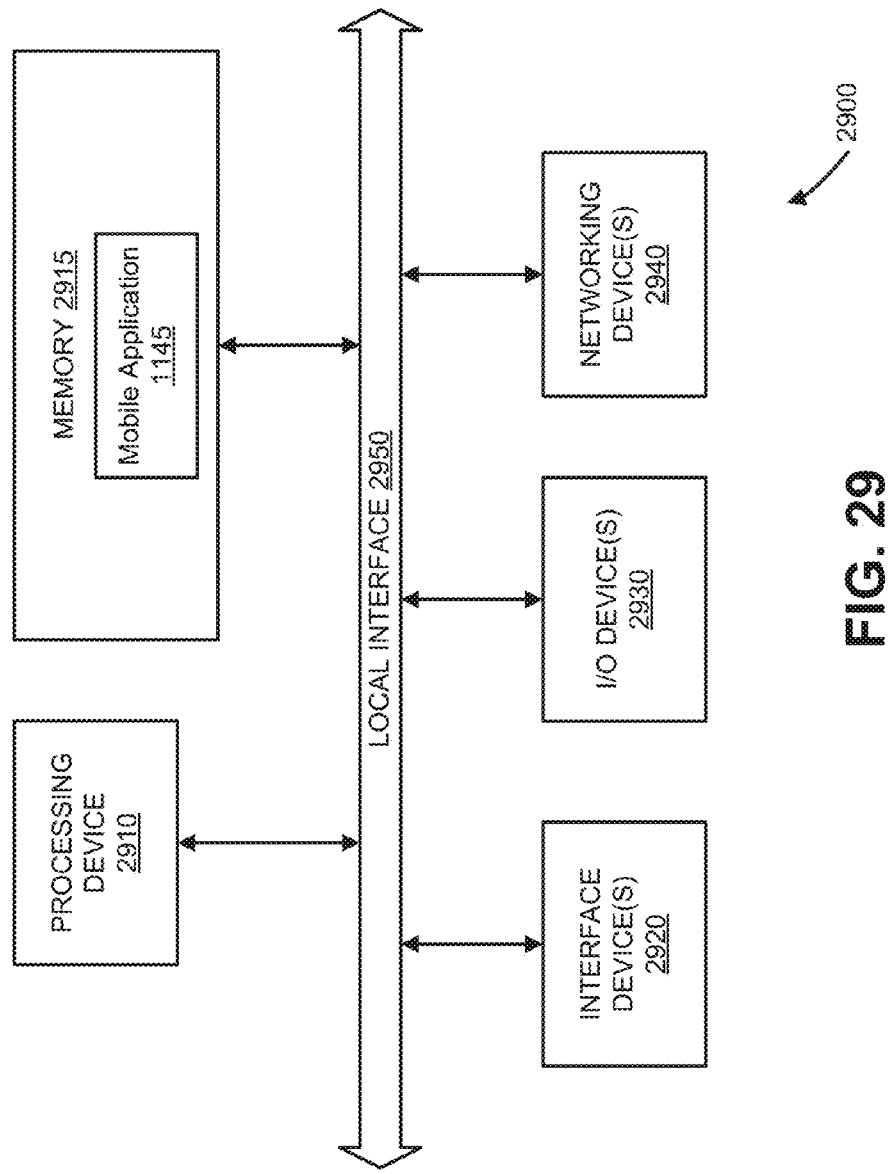
FIG. 29 is a block diagram illustrating an exemplary architecture for a generic computer that is similar to the architecture of the computing devices, such as that shown in FIGS. 10 and 11.

FIG. 29 is a block diagram illustrating an exemplary architecture for a generic computer 2900 that is similar to the architecture of the computing devices 1000, 1120, 1125, 1135, 1145, such as that shown in FIGS. 10 and 11. Similar to the computing device 1000, the generic computer 2900 also comprises a processing device 2910, memory 2915, one or more user interface devices 2920, one or more I/O devices 2930, and one or more networking devices 2940, each of which is connected to a local interface 2950. In this example, the memory 2915 further includes the mobile application 1145, which is described above.

This description has been presented for purposes of illustration and description. It is not intended to be exhaustive or to limit the disclosure to the precise forms disclosed. Obvious modifications or variations are possible in light of the above teachings. The embodiments discussed, however, were chosen to illustrate the principles of the disclosure, and its practical application. The disclosure is thus intended to enable one of ordinary skill in the art to use the disclosure, in various embodiments and with various modifications, as are suited to the particular use contemplated. All such modifications and variation are within the scope of this disclosure, as determined by the appended claims when interpreted in accordance with the breadth to which they are fairly and legally entitled.

Therefore, having thus described the disclosure, at least the following is claimed:

1. A telecommunication messaging and real-time replenishment (TMRTR) system comprising:
    a user interface configured to receive a user input and transmit the user input that includes a recipient phone number associated with a phone user's account;
    a messaging server configured to establish a chat session among users; and
    a real-time replenishment (RTR) gateway that receives and transmits the chat messages received from the messaging server and the phone number from the user interface and requests for a telephone service company associated with the phone number to a home location register (HLR) look up service, wherein the HLR look up service receives the phone number from the RTR gateway and the request for the telephone service company associated with the phone number,
    wherein the HLR look up service determines the telephone service company associated with the phone number and transmits the information related to the determined telephone service company to the RTR gateway,
    wherein the RTR gateway tops up phone minutes and/or balance of money of the phone user's account as directed through chat messages received from the messaging server and based on the phone number of the received user input and the determined telephone service company from the HLR look up service.

2. The TMRTR system as defined in claim 1, further comprising a database that receives and stores information related to the top up of the phone minutes and/or money of the phone user's account from the RTR gateway.

3. The TMRTR system as defined in claim 1, wherein the RTR gateway verifies where the phone user's account is a valid phone number having phone minutes and/or amount of money that can be top-up, recharge, add, and/or transfer the phone minutes and/or money into the phone user's account.

4. The TMRTR system as defined in claim 1 wherein the HLR look up service receives the phone number from the top-up gateway and a request for the geographical location associated with the phone number from the top-up gateway, wherein the HLR look up service determines the geographical location associated with the phone number and transmits the information related to the determined geographical location to the top-up gateway, wherein the top-up gateway tops up phone minutes and/or balance of money of the phone user's account associated with the phone number based on the phone number, determined telephone service company and determined geographical location.

5. The TMRTR system as defined in claim 1, wherein the user interface receives and transmits the user input that includes a request for sending an eGift to the recipient phone number associated with the phone user's account.

6. The TMRTR system as defined in claim 5, further comprising an order interface that processes the eGift request and sent the processed eGift request to the user interface, wherein the order interface processes the eGift request by obtaining payment information and verify the financial transaction based on the obtained payment information.

7. The TMRTR system as defined in claim 6, further comprising:
    rewards interface that tracks, awards, and applies rewards to a user's account; and
        a third party provider that receives, verifies and validates the processed eGift request.

8. A non-transitory computer readable medium comprising a mobile software application that is stored in memory and has instructions that are executed by a processing device, the instructions including the following logics:
    receive a user input and transmit the user input that includes a phone number associated with a phone user's account;
    establishes a chat session among users;
    request for a telephone service company associated with the phone number from a home location register (HLR) look up service,
    receive information related to the requested telephone service company associated with the phone number from the HLR look up service; and
    top-up phone minutes and/or balance of money of the phone user's account associated with the phone number as directed through chat messages received through the chat session and based on the phone number of the received user input, and the received telephone service company received from the HLR look up service.

9. The computer readable medium as defined in claim 8, further including the logic of storing information related to the top up of the phone minutes and/or money of the phone user's account.

10. The computer readable medium as defined in claim 8, further including the logic of verifying whether the phone user's account is a valid phone number having phone minutes and/or amount of money that can be top-up, recharge, add, and/or transfer the phone minutes and/or money into the phone user's account.

11. The computer readable medium as defined in claim 8, further including the logics of:
    requesting for a geographical location associated with the phone number from a home location register (HLR) look up service;
    receiving information related to the requested geographical location associated with the phone number from the HLR look up service; and topping up phone minutes and/or balance of money of the phone user's account associated with the phone number based on the phone number, received telephone service company, and received geographical location.

12. The computer readable medium as defined in claim 8, further including the logic of receiving and transmitting the user input that includes a request for sending an eGift to the recipient phone number associated with the phone user's account.

13. The computer readable medium as defined in claim 8, further including the logic of processing the eGift request and sending the processed eGift request to a user interface.

14. The computer readable medium as defined in claim 8, further including the logic of:
   tracking, awarding, and applying rewards to a user's account; and
   verifying and validating the processed eGift request.

15. A telecommunication messaging and real-time replenishment (TMRTR) system comprising:
   a messaging interface configured to establish a chat session among users;
   a user interface that receives a user input through a chat message from the chat session and transmits the user input that includes a request for sending an eGift to a recipient phone number associated with a phone user's account;
   an order interface that processes the eGift request and sends the processed eGift request to the user interface; and
   a real-time replenishment (RTR) gateway that receives and transmits the processed eGift request to a third party provider that verifies and validates the processed eGift request.

16. The TMRTR system as defined in claim 15, wherein the order interface processes the eGift request by obtaining payment information and verify the financial transaction based on the obtained payment information.

17. The TMRTR system as defined in claim 15, further comprising payment interface that list payment methods at the user interface and obtain payment information.

18. The TMRTR system as defined in claim 15, wherein the user input includes a chat message that includes the request for sending the eGift.

19. The TMRTR system as defined in claim 18, wherein the chat message includes a request for topping up phone minutes and/or balance of money of the user's account based on the phone number of the received user input.

20. The TMRTR system as defined in claim 19, wherein the real-time replenishment (RTR) gateway receives and transmits the chat messages and the phone number from the user interface and requests for a telephone service company associated with the phone number to a home location register (HLR) look up service, wherein the HLR look up service receives the phone number from the RTR gateway and the request for the telephone service company associated with the phone number,
   wherein the HLR look up service determines the telephone service company associated with the phone number and transmits the information related to the determined telephone service company to the RTR gateway,
   wherein the RTR gateway tops up phone minutes and/or balance of money of the phone user's account based on the phone number of the received user input and the determined telephone service company from the HLR look up service.

* * * * *